(12) United States Patent
Colson et al.

(10) Patent No.: US 7,904,408 B2
(45) Date of Patent: Mar. 8, 2011

(54) METHOD AND SYSTEM FOR MONITORING INNOVATION ACTIVITY

(75) Inventors: Thomas J. Colson, Clarence, NY (US); Samuel C. Baxter, Brewster, MA (US)

(73) Assignee: IP.com I, LLC, Amherst, NY (US)

( * ) Notice: Subject to any disclaimer, the term of this patent is extended or adjusted under 35 U.S.C. 154(b) by 795 days.

(21) Appl. No.: 11/803,601

(22) Filed: May 15, 2007

(65) Prior Publication Data

US 2008/0288431 A1    Nov. 20, 2008

(51) Int. Cl.
*G06F 17/00* (2006.01)
*G06N 5/02* (2006.01)

(52) U.S. Cl. .............. 706/47; 717/108; 707/748

(58) Field of Classification Search .............. 706/47; 717/108; 707/5
See application file for complete search history.

(56) References Cited

U.S. PATENT DOCUMENTS

| | | | |
|---|---|---|---|
| 7,350,191 B1 * | 3/2008 | Kompella et al. | 717/108 |
| 2005/0097000 A1 * | 5/2005 | Freishtat et al. | 705/26 |
| 2007/0198564 A1 * | 8/2007 | Blackstone et al. | 707/101 |
| 2007/0220035 A1 * | 9/2007 | Misovski | 707/102 |

* cited by examiner

*Primary Examiner* — Donald Sparks
*Assistant Examiner* — Kalpana Bharadwaj
(74) *Attorney, Agent, or Firm* — Simpson & Simpson, PLLC

(57) ABSTRACT

A computer based method for monitoring innovation activity including: accumulating first metadata associated with a first plurality of intellectual knowledge files; extracting a first plurality of patterns from the first plurality of intellectual knowledge files; creating a first plurality of concept spaces, using rules-based processing, the first metadata, and the first patterns; grouping, using rules-based processing, the first metadata, and the first plurality of patterns, the first plurality of intellectual knowledge files into first respective concept spaces in the first plurality of concept spaces; and generating a report, the report correlating the first plurality of intellectual knowledge files and the first respective concept spaces. The steps of accumulating, extracting, creating, grouping, and generating are performed by a general-purpose computer specially programmed to perform the steps of accumulating, extracting, creating, grouping, and generating.

22 Claims, 26 Drawing Sheets

METHOD AND SYSTEM FOR MONITORING INNOVATION ACTIVITY

FIELD OF THE INVENTION

The invention relates generally to the monitoring and categorizing of innovation activity. More specifically, the invention automatically collects and classifies intellectual knowledge files into concept groups using metadata and rules-based processing.

BACKGROUND OF THE INVENTION

It is vital for a business entity to monitor the activity and work product of researchers and others involved in the development of products or services associated with the business entity. For example, intellectual property professionals, such a corporate legal counsel, are tasked with the responsibility of invention scanning. Invention scanning is a process in which corporate intellectual property professionals meets with technical leaders and innovators on a regular basis to assess and guide innovation activities to support the overall corporate intellectual property strategy. Further, the amount and quality of innovative activity is often a measure of an inventor's or innovator's productivity. Therefore, invention scanning also involves a review and analysis of innovative activity.

Unfortunately, there are inherent problems associated with invention scanning as currently practiced. For example, invention scanning often requires extensive travel and time commitments on the part of intellectual property professionals and the participation of large number of personnel, which drains corporations of time, money, and resources. Further, most intellectual property professionals do not have the time to perform detailed analysis of areas of inventive or innovative activity, to monitor, in detail, the activities of inventors or innovators, or to meet regularly with inventors or innovators, since intellectual property professionals are often highly leveraged by other high priority activities and such analysis and meetings require extensive time commitments and travel. Consequently, innovators and inventors often send disclosures to intellectual property professionals in lieu of meetings, leaving intellectual property professionals to collate and review such documentation. This process severely limits the ability of intellectual property professionals to accurately guide the patent decision process in a timely manner.

Thus, there has been a long felt need for a process that would automatically cluster the work product of researchers and others involved in the development of products or services into easily understood and reviewed concept spaces and graphical representations that would enable a rapid, accurate, and focused analysis of the work product, providing actionable business intelligence. There also is a long-felt need to enable drilling into areas of interest across an enterprise, analyzing activity by in-common technical or business concepts. There is a further long-felt need to measure and monitor the productivity of inventors and innovators.

BRIEF SUMMARY OF THE INVENTION

The present invention broadly comprises a computer based method for monitoring innovation activity including: accumulating first metadata associated with a first plurality of intellectual knowledge files; extracting a first plurality of patterns from the first plurality of intellectual knowledge files; creating a first plurality of concept spaces, using rules-based processing, the first metadata, and the first patterns; grouping, using rules-based processing, the first metadata, and the first plurality of patterns, the first plurality of intellectual knowledge files into first respective concept spaces in the first plurality of concept spaces; and generating a report, the report correlating the first plurality of intellectual knowledge files and the first respective concept spaces. The steps of accumulating, extracting, creating, grouping, and generating are performed by a general-purpose computer specially programmed to perform the steps of accumulating, extracting, creating, grouping, and generating.

In some aspects, the method assigns second metadata, responsive to the grouping of the first plurality of intellectual knowledge files, to at least a portion of the first plurality of intellectual knowledge files; creates a second plurality of concept spaces, using rules-based processing and the second metadata; and groups, using rules-based processing and the second metadata, the at least a portion of the first plurality of intellectual knowledge files into respective concept spaces in the second plurality of concept spaces. The steps of assigning, creating, and grouping are performed by the general-purpose computer.

In some aspects, the method accumulates third metadata associated with a second plurality of intellectual knowledge files; extracts a second plurality of patterns from said second plurality of intellectual knowledge files; creates a third plurality of concept spaces, using rules-based processing, the first and third metadata, and the first and second plurality of patterns; and groups, using rules-based processing, the third metadata, and the second plurality of patterns, the first and second pluralities of intellectual knowledge files into respective concept spaces in the third plurality of concept spaces. The steps of accumulating, extracting, creating, and grouping are performed by the general-purpose computer. In some aspects, the method accumulates fourth metadata associated with an intellectual knowledge file and assigns, using rules-based processing and the fourth metadata, the intellectual knowledge file to a concept space in the first plurality of concept spaces. The steps of accumulating and assigning are performed by the general-purpose computer. In some aspects, the method automatically aggregates the first plurality of intellectual knowledge files. The automatic aggregating is performed by the general-purpose computer.

The present invention also broadly comprises a computer based method for monitoring innovation activity including: accumulating first metadata associated with an intellectual knowledge file; extracting at least one pattern from said intellectual knowledge file; assigning, using rules-based processing, the first metadata, and the at least one pattern, the intellectual knowledge file to a concept space among a plurality of existing concept spaces; and generating a report, the report correlating the intellectual knowledge file and the plurality of concept spaces. The steps of accumulating, extracting, assigning, and generating are performed by a general-purpose computer specially programmed to perform the steps of accumulating, extracting, performing, and generating.

In some aspects, the method accumulates second metadata associated with a first plurality of intellectual knowledge files; extracts a first plurality of patterns from the first plurality of intellectual knowledge files; creates a first plurality of concept spaces, using rules-based processing, the first metadata, and the first plurality of patterns, wherein the plurality of existing concept spaces comprises the first plurality of concept spaces; and groups, using rules-based processing, the second metadata and the first plurality of patterns, the first plurality of intellectual knowledge files into first respective concept spaces in the first plurality of concept spaces. The steps of accumulating, extracting, creating, and grouping, are performed by the general-purpose computer.

In some aspects, the method assigns third metadata, responsive to assigning the intellectual knowledge file, to at least a portion of the first plurality of intellectual knowledge files; creates a second plurality of concept spaces, using rules-based processing and the third metadata; and groups, using rules-based processing and the third metadata, the at least a portion of the first plurality of intellectual knowledge files into respective concept spaces in the second plurality of concept spaces. The steps of assigning, creating, and grouping are performed by the general-purpose computer.

In some aspects, the method accumulates fourth metadata associated with a second plurality of intellectual knowledge files; extracts a second plurality of patterns from the second plurality of intellectual knowledge files; creates a third plurality of concept spaces, using rules-based processing, the second and fourth metadata, and the first and second pluralities of patterns; and groups, using rules-based processing, the second and fourth metadata, and the first and second pluralities of patterns, the first and second pluralities of intellectual knowledge files into respective concept spaces in the third plurality of concept spaces. The steps of accumulating, extracting, creating, and grouping are performed by the general-purpose computer. In some aspects, the method automatically aggregates the first plurality of intellectual knowledge files and the automatic aggregating is performed by the general-purpose computer.

The present invention further broadly comprises a computer based method for monitoring innovation activity including: accumulating first metadata associated with a plurality of intellectual knowledge files; creating a plurality of concept spaces, using rules-based processing, said first metadata, and said plurality of knowledge files; grouping, using rules-based processing and said first metadata, said plurality of intellectual knowledge files into respective concept spaces in said plurality of concept spaces; accumulating second metadata associated with an intellectual knowledge file; assigning, using rules-based processing and said second metadata, said intellectual knowledge file to a concept space among a plurality of concept spaces; and generating a report, said report correlating said plurality of intellectual knowledge files and said intellectual knowledge file with said plurality of concept spaces. The steps of accumulating first and second metadata, creating, grouping, assigning, and generating are performed by a general-purpose computer specially programmed to perform said steps of accumulating first and second metadata, creating, grouping, assigning, and generating.

The present invention broadly comprises a computer based system for monitoring innovation activity including: a first metadata element arranged to accumulate metadata associated with a first plurality of intellectual knowledge files; a rules-based processor arranged to: extract a first plurality of patterns from the first plurality of intellectual knowledge files; create a first plurality of concept spaces using the first metadata and the first plurality of patterns; and group, using the first metadata and the first plurality of patterns, the first plurality of intellectual knowledge files into first respective concept spaces in the first plurality of concept spaces; and a report generator arranged to correlate the first plurality of intellectual knowledge files and the first respective concept spaces. The first metadata element, the processor, and the report generator are located in at least one specially programmed general-purpose computer.

The present invention broadly comprises a computer based system for monitoring innovation activity including: a first metadata element arranged to accumulate first metadata associated with an intellectual knowledge file; a first rules-based processor arranged to: extract at least one pattern from the intellectual knowledge file; and assign, using the first metadata and the at least one pattern, the intellectual knowledge file to a concept space among a plurality of existing concept spaces; and a report generator arranged to generate a report correlating the intellectual knowledge file and the plurality of concept spaces, wherein the first metadata element, the rules-based processor, and the report generator are located in at least one specially programmed general-purpose computer.

The present invention broadly comprises a computer based system for monitoring innovation activity including: a metadata element arranged to accumulate first metadata associated with a plurality of intellectual knowledge files and to accumulate second metadata associated with an intellectual knowledge file; a rules-based processor arranged to: extract a plurality of patterns from the plurality of intellectual knowledge files; create a plurality of concept spaces using the first metadata and the plurality of patterns; group, using the first metadata and the plurality of patterns, the plurality of intellectual knowledge files into respective concept spaces in the plurality of concept spaces; extract at least one pattern from the intellectual property file; and assign, using the second metadata and the at least one pattern, the intellectual knowledge file to a concept space among the plurality of concept spaces; and a report generator arranged to correlate the plurality of intellectual knowledge files and the intellectual knowledge file with the plurality of concept spaces, wherein the metadata element, the rules-based processor, and the report generator are located in at least one specially programmed general-purpose computer.

It is a general objective of the present invention to provide a method and system to enable the efficient and cost-effective tracking of innovation activity in an enterprise.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
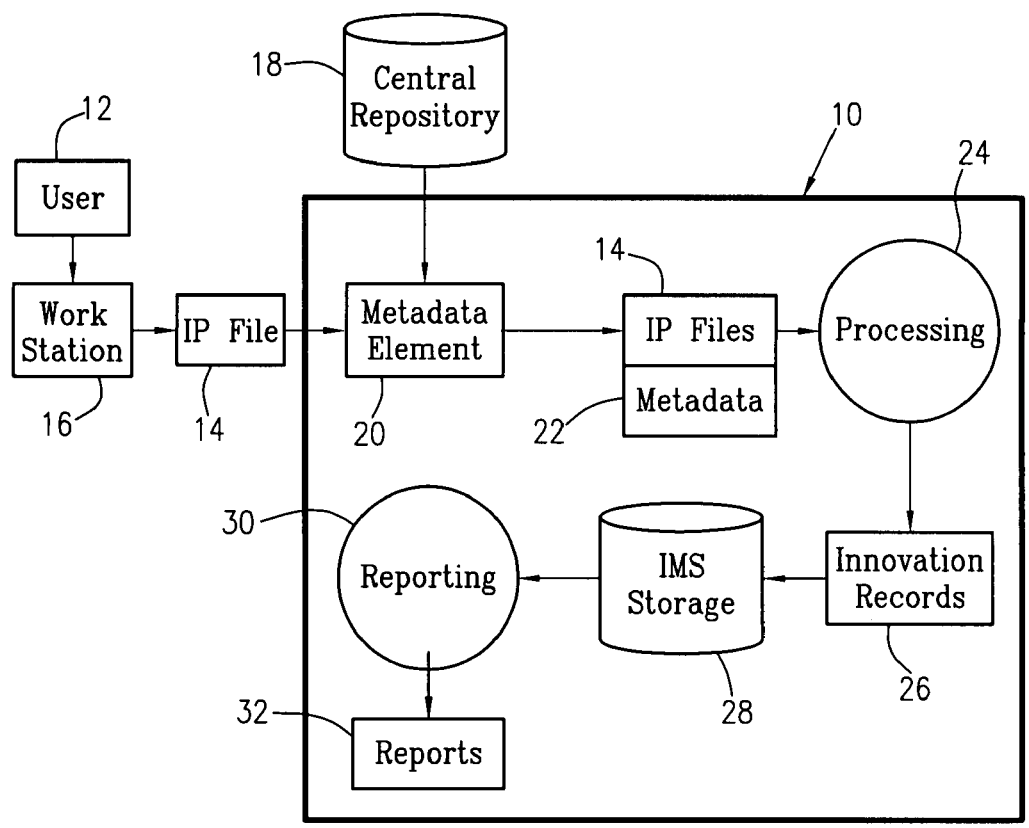
FIG. 1 is a pictorial representation of a present invention system for monitoring innovation activity.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The present invention is generally directed to the collection, classification, and reporting of intellectual property (IP) files across an enterprise. By IP files, we mean files that contain intellectual knowledge or information around products or services that are researched, developed, produced, or provided by an enterprise. One example of intellectual property files is research and development documents forming an invention disclosure for a patent application. Other examples include formal or informal disclosures that may not necessarily be directed to a potential patent application, or files regarding trade secrets. Alternately stated, IP files are generally directed to innovative activity and the present invention is directed to collecting, monitoring, classifying, and presenting such innovative activity. Thus, by organizing IP files into customizable concept clusters that are domain or line of business specific, the present invention provides reports to IP professionals, replacing traditional invention scanning methods, such as extensive meetings and travel. In the interest of simplicity, in the discussions that follow, personnel generating IP files are referred to as researchers, although it should be understood that personnel generating IP files are not limited to this description.

The present invention transforms IP files into innovation records and places the innovation records into an Innovation Management System (IMS). As further described below, IP files can include text, data, multi-media, for example, audio/visual, and metadata regarding the files. One purpose of gathering IP files and converting the files to innovations records in an IMS is to monitor the productivity of personnel, for example, researchers, producing work products. Another purpose of gathering IP files and converting the files to innovations records in an IMS is to create an innovation content corpus to which automatic concept clustering can be applied. Concept based reporting on innovations records throughout an enterprise can serve as a substitute for traditional Invention Scanning.

Computer files containing a researcher's work product are usually the property of the researcher's employer. As such, these computer files are usually stored on computer systems under the direct control of the researcher's employer. If researchers primarily use desktop or laptop computer systems on which to store their computer files, such systems are typically attached to the employer's computer network on a regular, if not constant, basis. Some employer's have researchers store their computer files on a central system (such as a server that provides a storage resource) that is attached to the employer's computer network.

In addition to a computer IP file itself, there are attributes, known as metadata, associated with the computer file. For example, an IP file is virtually always known to have been stored on a particular computer in a particular location with a particular name. Also, depending on the source of the file, other information may be known, such as the original owner of the file, when the file was created, or when the file was last modified. Alternately stated, the information in an IP file itself is the file data and the information about the file is the file metadata. The present invention copies or moves both IP file data and IP file metadata to a central location. By collecting IP computer files, data, and metadata in a central location and performing rules-based processing, an IP file is transformed into an innovation record and placed into the IMS.

As further described below, additional metadata such as custom or system generated document tags, associated with the operations of the IMS, can be added to innovation records by the IMS as a means of providing further information that is used for further automatic categorization or classification.

FIG. 1 is a pictorial representation of present invention Innovation Management System (IMS) 10 for monitoring innovation activity. Typically, researcher, or user, 12 produces one or more IP files 14 on respective computer workstation 16. It should be understood that workstations 16 can be any computer known in the art, for example, a desk top computer or a lap top computer. IP files 14 are typically electronic computer files, many of which are entirely textual documents and some of which contain at least some text. The amount and quality of the IP files are often a measure of a researcher's productivity and system 10 enables the measuring and monitoring of researcher productivity.

In some aspects, files 14 are stored in central repository 18 for the enterprise with which the researcher is associated. Then, the files are aggregated from the repository into system 10. In some aspects, system 10 aggregates the files directly from workstation 16. In either case, metadata element 20 operates on files 14 to accumulate respective metadata 22 for the files. Automated rules-based processing 24 transforms file 14, including data in the file, and metadata 22 into respective innovation records 26. Records 26 are stored in IMS storage repository 28. Report generator 30 produces reports 32.

Processing 24 can include: byte pattern analysis; analysis of text, audio, or video properties; rules applied to metadata, such as computer name, drive folder hierarchy, filename internal (LDAP), and organization specific rules; and bibliographic extraction. Information generated by processing a file is extracted and all or portions of it are stored as part of innovation records 26. These extracted items of information are recorded independently into the innovation record for future ease of processing. For example, in addition to storing the original file data and metadata in the innovation record, copies of the discovered information such as text, images, audio, video, properties, and structured fields may also be stored.

Pattern analysis involves examining file data and making a determination regarding the data format by looking for particular patterns in the data. If the data is determined to be of a recognizable format, specific processes regarding that format are applied. For example, Adobe® Portable Document Format (PDF) data always begins with a certain pattern of bytes. If file data contains this pattern, the file is determined to be and processed as a PDF file. A PDF file may contain a variety of information including text, images, and properties. As another example, Microsoft® Word Documents (DOC) data always begins with a certain pattern of bytes. If the file data contains this pattern, the file is determined to be and processed as a Microsoft® Word file. Such a file may contain a wide variety of information, including text, images, drawings, properties, audio clips, video clips, and structured (tagged) fields.

Examining metadata involves applying rules, comparisons, and/or patterns to certain metadata to derive information from the metadata. One item of metadata may be a fully qualified name which contains the computer name, drive, folder hierarchy, and file name. For example in Microsoft® Windows: \\Computer\Drive$\Folder\SubFolders\File.Ext. The "Computer" portion of this metadata may be an indication of the author of the file because the computer is used exclusively by one person. One part of the "SubFolders" portion may be an indication of a particular category to which the file belongs. A different part of the "SubFolders" portion may be an indication of the author of the file.

Rules, comparisons, or patterns applied to metadata may be made specific to a particular organization or portion of an organization. Different computer environments may require alternate rules applicable to the methods of computer usage and organization associated with the environment.

As another example of a method for determining the author a file, part of a file's metadata may be an internal name (such as one referring to an entry in a company-wide LDAP directory) indicating the person who created the file. In some computer environments, this internal name may be an indication of the author of the file.

In some aspects, unstructured data, for example, content of the original IP files can be indexed by full text and other analysis tools for later use. Similarly, metadata such as structured data or fields can be indexed by full text or other analysis tools for later use. Any analysis tools known in the art, including, but not limited to full text searching engines and concept query engines can be used.

In some aspects, metadata, such as bibliographic fields can be extracted from respective innovation records.

In some aspects, system 10, for example, report generator 30, generates a report listing information regarding records generated by the system. A time span can be set within which to search and compile records to include in the report. Also, filters can be used to further select or exclude records for the report.

In some aspects, system 10, for example, report generator 30, is configured to provide periodic alerts regarding files within the system. Any field or fields in the files can be scanned to trigger an alert and a time span can be set within which to perform a scan and provide an alert.

In some aspects, a user is able to link with documents included in a record and/or report. That is, a user is able to drill down from a report to access documents included in the report.

Figure 2:
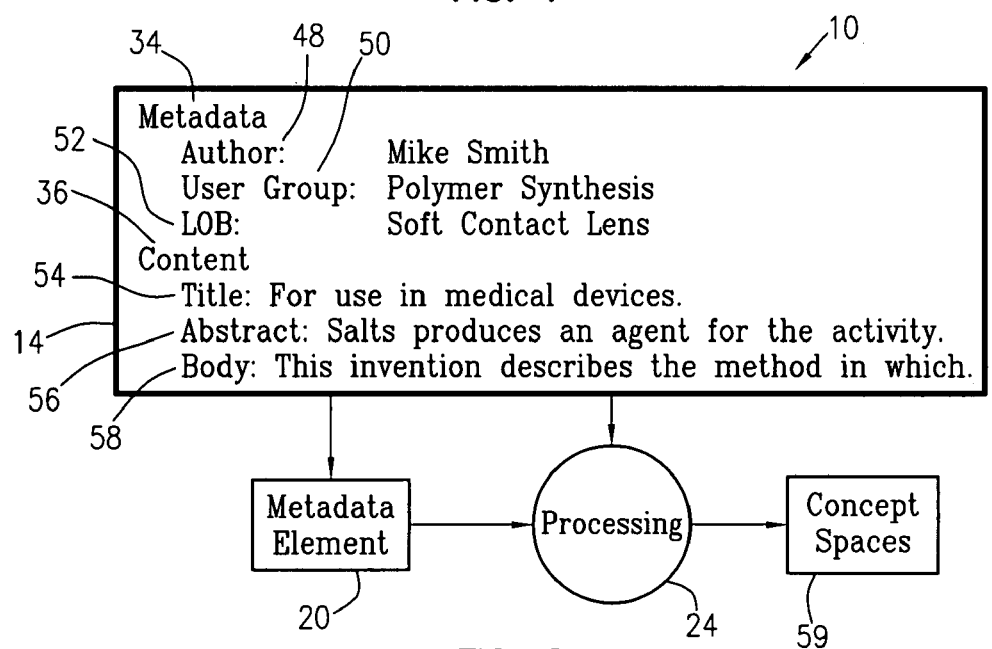
FIG. 2 is a diagrammatic example of the operation of the system in FIG. 1.

FIG. 2 is a diagrammatic example of the operation of system 10 in FIG. 1. The following should be viewed in light of FIGS. 1 and 2. Conversion of multiple IP files into respective innovation records within system 10 results in an innovation content corpus. IP file 14 includes metadata 34 and content 36. Metadata 34 serves as a first line of file categorization. Element 20 extracts relevant information from the metadata and provides the information to processing 24. Patterns, or concepts, are identified and extracted from content 36 by process 24. It should be understood that patterns are not limited to text and that patterns in other content such as data, graphics, or audio/visual can be identified and extracted.

For the example shown in FIG. 2, an enterprise, such as a contact lens company, may have several lines of business (LOBs) based on markets and technical domains. Metadata 34 includes fields such as author 48, user group 50, and LOB 52. Content 36 typically contains descriptions or concepts related to an innovation. For example, content 36 includes the fields: title 54, abstract 56, and body 58. In this example, element 20 extracts the words, phrases, or concepts: "Mike Smith," "Polymer Synthesis," and "Soft Contact Lens," respectively from fields 48, 50, and 52. Process 24 extracts the words, phrases, or concepts: "self sterilizing polymers," "seeding monomers with silver," "reduction of surface microbial bacteria," and "microbial" respectively from fields 54, 56, and 58.

Process 24 uses automatic concept clustering techniques, or algorithms, to create one or more concept spaces 54 applicable to files 14. Then, using automatic concept clustering techniques, or algorithms, algorithm 24 groups files 14 into respective applicable concept spaces 59. As a result, IP files are clustered based on the concepts contained within the files. Report generator 30 generates reports 32 based on the grouping of files 14 into the concept spaces. Thus, system 10 produces reports of innovation activities based on the combination of innovation record metadata and the concepts contained within the innovation record serve, which reports replace traditional innovation scanning methods.

Figure 3:
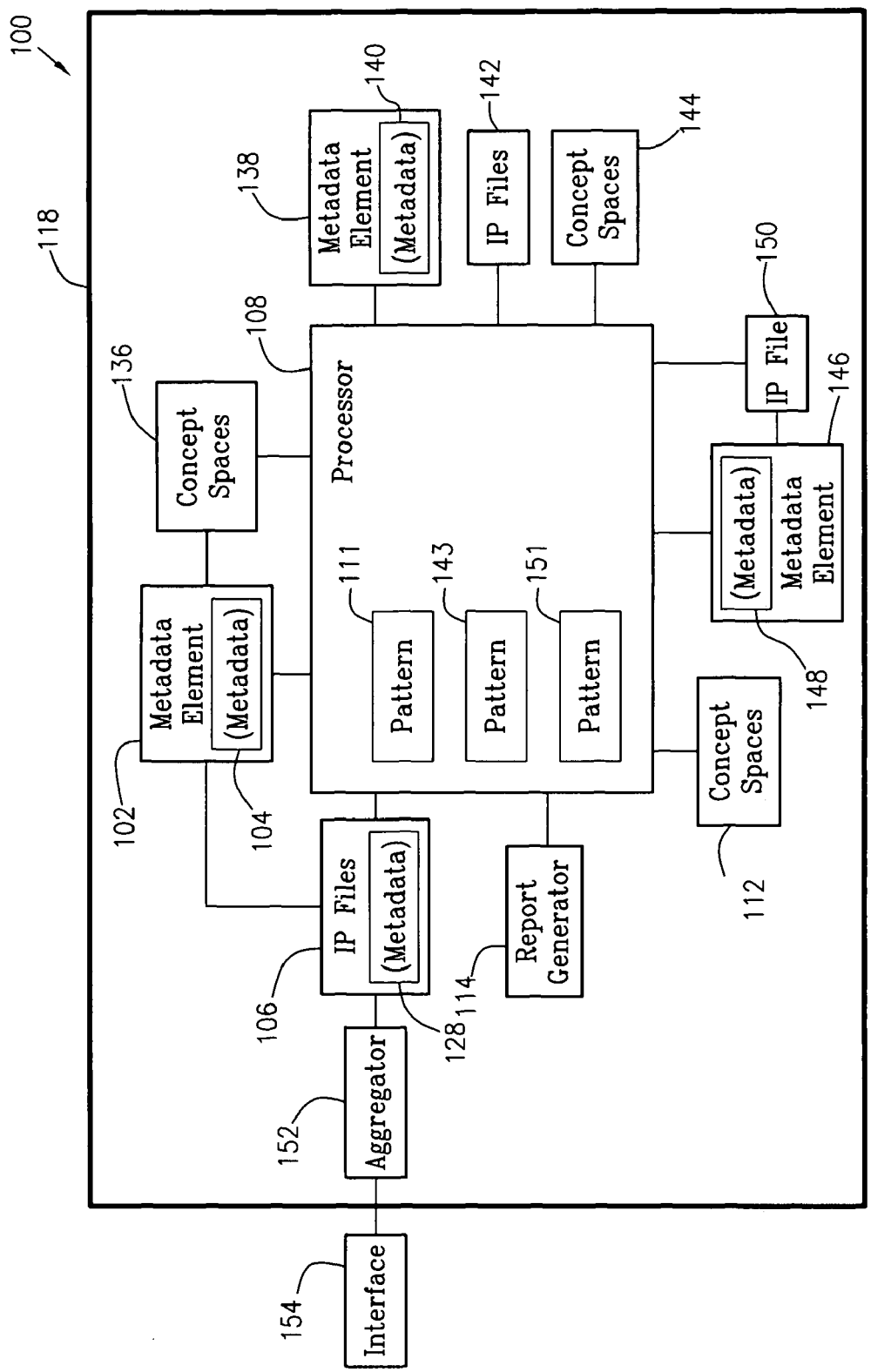
FIG. 3 is a schematic representation of a present invention computer based system for monitoring innovation activity.

FIG. 3 is a schematic representation of present invention computer based system 100 for monitoring innovation activity. System 100 includes metadata element 102 arranged to accumulate metadata 104 associated with a plurality of intellectual knowledge files 106 and processor 108. Processor 108 is arranged to extract a plurality of patterns 111 from files 106 using rules-based processing and is arranged to create a plurality of concept spaces 112 using metadata 104 and patterns 111. The processor also is arranged to group intellectual knowledge files 106 into respective concept spaces in concept spaces 112 using metadata 104 and patterns 111. System 100 also includes report generator 114 arranged to correlate intellectual knowledge files 106 with the respective concept spaces in concept spaces 112. Elements 102, processor 108, and generator 114 are located in at least one specially programmed general-purpose computer 118.

It should be understood that any rules-based processor known in the art can be used for processor 108, more than one processor may be used to perform the functions described for processor 108, and that any combination of hardware, firmware, or software known in the art can be used for the processor.

In some aspects, metadata element 102 is arranged to assign metadata 128, responsive to the grouping of intellectual knowledge files 106 by processor 108, to at least a portion of intellectual knowledge files 106. That is, element 102 assigns additional metadata, unique to system 100, to files 106. Metadata 128 relates to the structure and organization of system 100, in comparison to metadata 104, for example, which relates to the structure and organization of the system, outside of system 100, in which files 106 were originally generated.

In some aspects, the processor is arranged to create a plurality of concept spaces 136 using metadata 128 and processor 108 is arranged to group intellectual knowledge files 106 into respective concept spaces in concept spaces 136 using metadata 128. Thus, using the metadata associated with the initial grouping of files into concept spaces 112, additional or parallel groupings files may be possible. In some aspects (not shown), the creating or grouping functions for processor 108 are performed by separate rules-based processors.

In some aspects, system 100 includes metadata element 138 arranged to accumulate metadata 140 associated with a plurality of intellectual knowledge files 142. Processor 108 is arranged to extract a plurality of patterns 143 from files 142. Then, processor 108 is arranged to create a plurality of concept spaces 144 using metadata 104 and 140 and patterns 111 and 143. Processor 116 also is arranged to group intellectual knowledge files 106 into respective concept spaces in concept spaces 144 using metadata 104 and 140 and patterns 111 and 143. In some aspects (not shown), the extracting, creating or grouping functions for processor 108 are performed by separate rules-based processors. Element 138 is located in general-purpose computer 118.

In some aspects, system 100 includes metadata element 146 arranged to accumulate metadata 148 associated with intellectual knowledge file 150. Processor 108 is arranged to extract at least one pattern 151 from file 150 and to assign intellectual knowledge file 150 to a concept space among concept spaces 112 using metadata 148 and pattern 151. In some aspects (not shown), the extracting and assigning function for processor 108 are performed by separate rules-based processors. Element 146 is located in general-purpose computer 118.

In some aspects, system 100 includes aggregator element 152 arranged to automatically aggregate intellectual knowledge files 106. Any aggregating function known in the art can be used for element 152. Element 152 can aggregate files from locations within computer 118 or can interface with systems separate from computer 118. Any type of interface 154 known in the art can be used with element 152, including, but not limited to, an Internet interface, a local area network, and a wide area network. Element 152 is located in general-purpose computer 118.

In some aspects (not shown), metadata elements 102, 138, and 146 are combined into one element or are combined into two elements.

Figure 4:
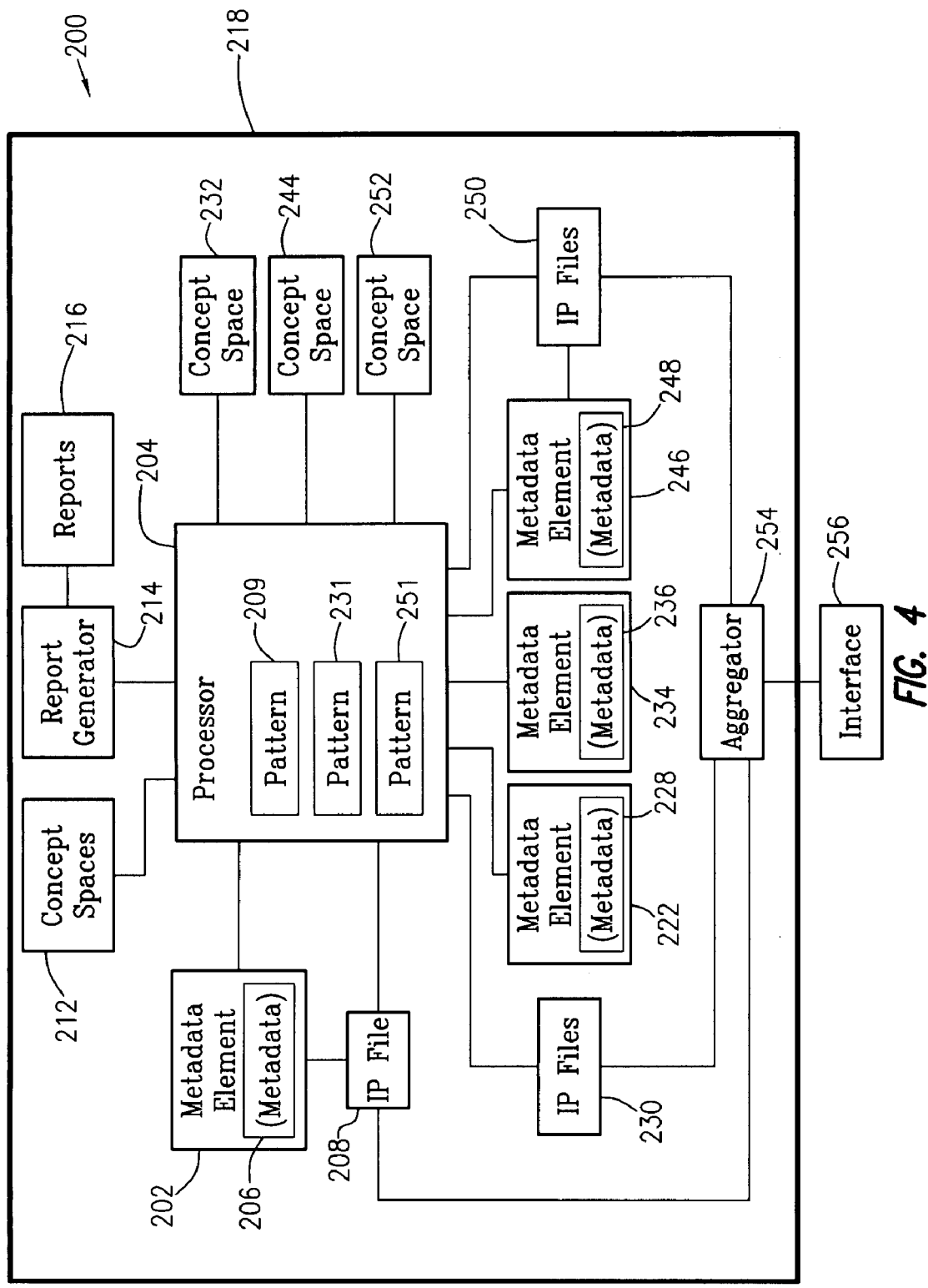
FIG. 4 is a schematic representation of a present invention computer based system for monitoring innovation activity.

FIG. 4 is a schematic representation of present invention computer based system 200 for monitoring innovation activity. System 200 includes metadata element 202 and rules-based processor 204. Element 202 is arranged to accumulate metadata 206 associated with intellectual knowledge file 208. The processor is arranged to extract at least one pattern 209 from file 208. Processor 204 is arranged to assign intellectual knowledge file 208 to at least one concept space among existing concept spaces 212 using metadata 206 and patterns 209. System 200 also includes report generator 214 arranged to generate report 216 correlating intellectual knowledge file 208 and concept spaces 212. Processor 204, element 202, and generator 214 are located in at least one specially programmed general-purpose computer 218.

It should be understood that any rules-based processor known in the art can be used for processor 204, more than one processor may be used to perform the functions described for processor 204, and that any combination of hardware, firmware, or software known in the art can be used for the processor.

In some aspects, system 200 includes metadata element 222 arranged to accumulate metadata 228 associated with a plurality of intellectual knowledge file 230. Processor 204 is arranged to extract a plurality of patterns 231 from files 230. Processor 204 also is arranged to create concept spaces 232 using metadata 228 and patterns 231. Processor 204 is arranged to group intellectual knowledge files 230 into respective concept spaces in concept spaces 232 using metadata 228 and patterns 231. In some aspects (not shown), the extracting, creating, and grouping functions of processor 204 are performed by separate processors. Element 222 is located in general-purpose computer 218.

In some aspects, system 200 includes metadata element 234 arranged to assign metadata 236, responsive to the assigning of intellectual knowledge file 208 by processor 204, to at least a portion of intellectual knowledge file 208. In some aspects, processor 204 is arranged to create a plurality of concept spaces 244 using metadata 236 and the at least a portion of intellectual knowledge file 208 and processor 204 is arranged to group the intellectual knowledge files 230 into respective concept spaces in concept spaces 244. Element 234 is located in general-purpose computer 218. In some aspects (not shown), the creating or grouping functions of processor 204 are performed by separate rules-based processors.

In some aspects, system 200 includes metadata element 246 arranged to accumulate metadata 248 associated with a plurality of intellectual knowledge files 250. In some aspects, processor 204 is arranged to extract a plurality of patterns 251 from files 250 and create a plurality of concept spaces 252 using metadata 248 and patterns 251. Then, processor 204 is arranged to group intellectual knowledge files 230 and 250 into respective concept spaces in concept spaces 252 using metadata 228 and 248 and patterns 231 and 251. In some aspects (not shown), the extracting, creating or grouping functions of processor 204 are performed by one or more separate rules-based processors. The metadata element is located in general-purpose computer 218.

In some aspects, system 200 includes aggregator element 254 arranged to automatically aggregate intellectual knowledge file 208 and files 230 and 250. Any aggregating function known in the art can be used for element 254. Element 254 can aggregate files from locations within computer 218 or can interface with systems separate from computer 218. Any type of interface 256 known in the art can be used with system 200, including, but not limited to, an Internet interface, a local area network, and a wide area network. The aggregator element is located in general-purpose computer 218.

In some aspects (not shown), metadata elements 202, 222, 234, and 246 are combined into one, two, or three elements.

Figure 5:
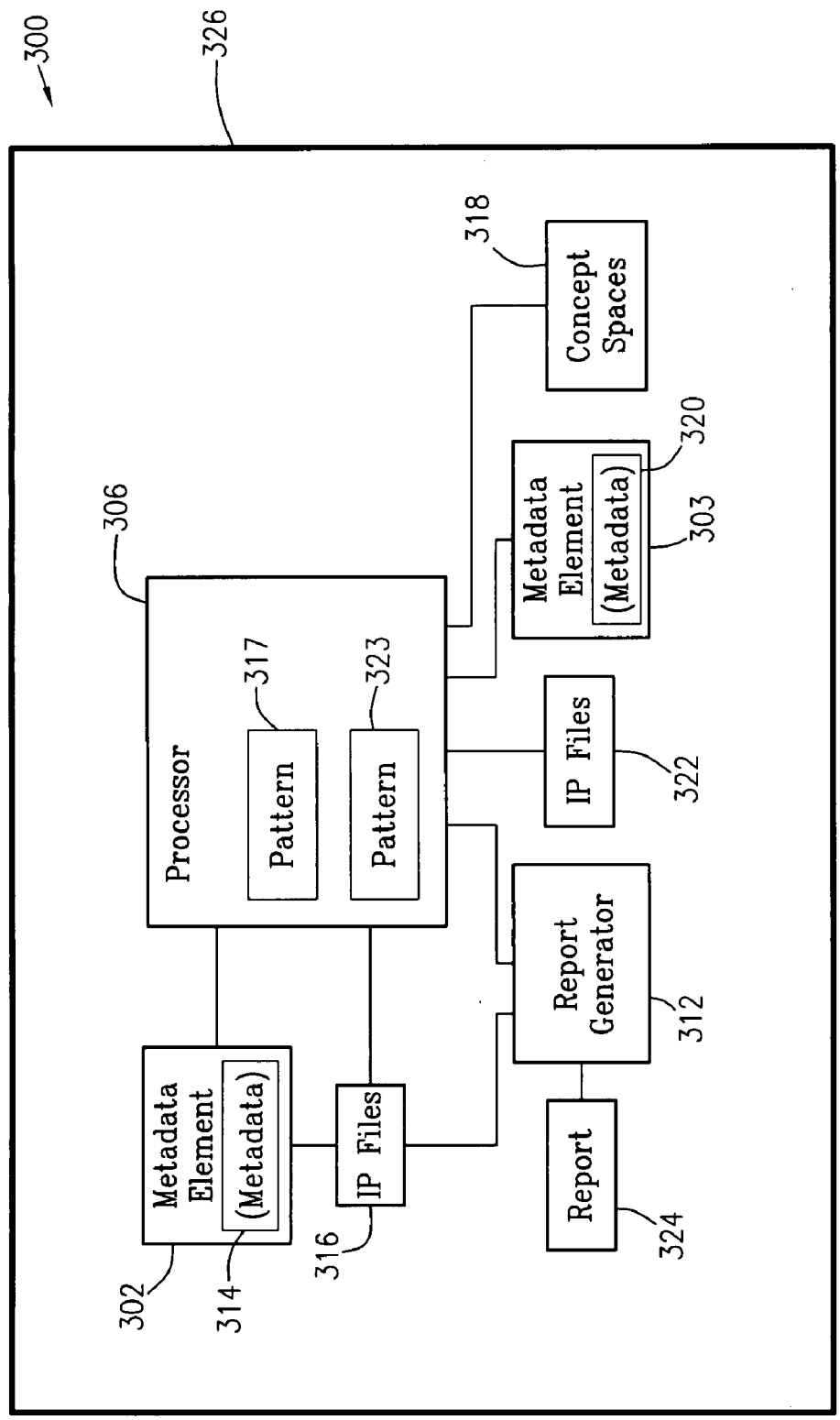
FIG. 5 is a schematic representation of a present invention computer based system for monitoring innovation activity.

FIG. 5 is a schematic representation of present invention computer based system 300 for monitoring innovation activity. System 300 includes metadata elements 302 and 303, rules-based processor 306, and report generator 312. Element 302 is arranged to accumulate metadata 314 associated with a plurality of intellectual knowledge files 316. Processor 306 is arranged to extract a plurality of patterns 317 from files 316. Processor 306 is arranged to create a plurality of concept spaces 318 using metadata 314 and patterns 317. Processor 306 is arranged to group intellectual knowledge files 316 into respective concept spaces in concept spaces 318 using metadata 314 and patterns 317.

It should be understood that any rules-based processor known in the art can be used for processor 306, more than one processor may be used to perform the functions described for processor 306, and that any combination of hardware, firmware, or software known in the art can be used for the processor.

Metadata element 303 is arranged to accumulate metadata 320 associated with intellectual knowledge file 322. The processor is arranged to extract at least one pattern 323 from file 322. Processor 306 is arranged to assign intellectual knowledge file 322 to a concept space among a concept spaces 318 using metadata 320 and pattern 323. Report generator 312 is arranged to produce report 324 correlating intellectual knowledge files 316 and 322 with concept spaces 318. Metadata elements 302 and 303, rules-based processor 306, and report generator 312 are located in at least one specially programmed general-purpose computer 326.

In some aspects (not shown), metadata elements 302 and 303 are combined into a single element.

Figure 6A:
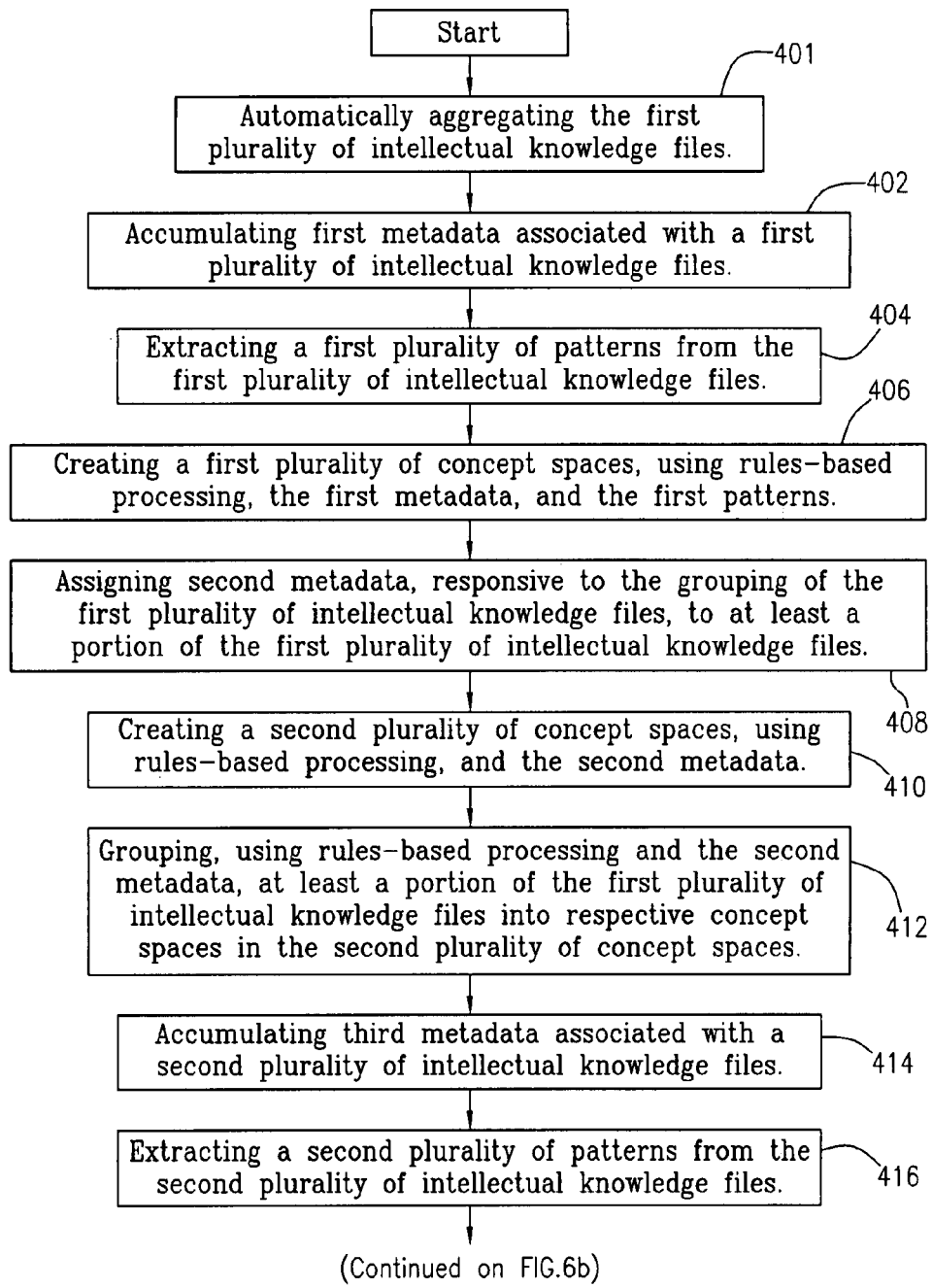
FIGS. 6a and 6b are a flow chart of a present invention method for monitoring innovation activity.
Figure 6B:
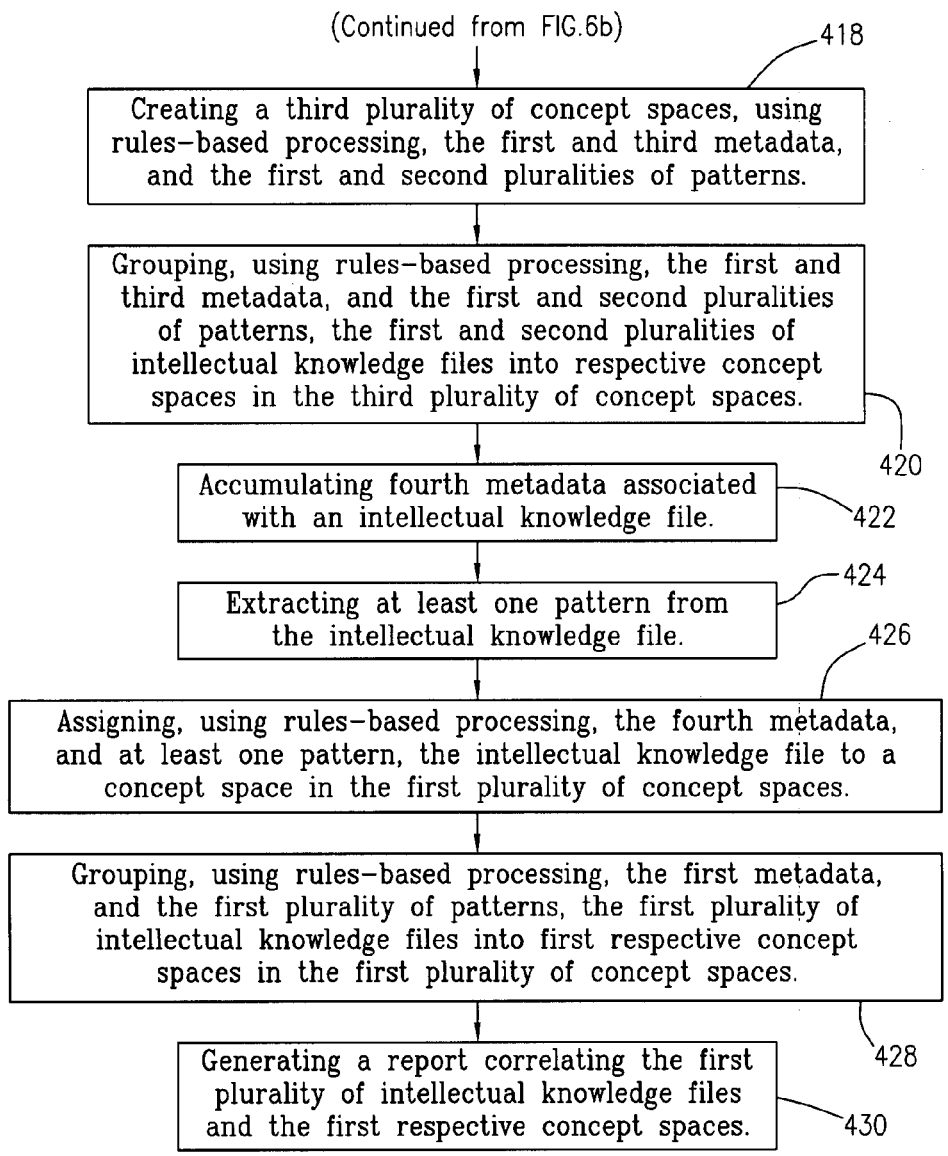
Figure 7A:
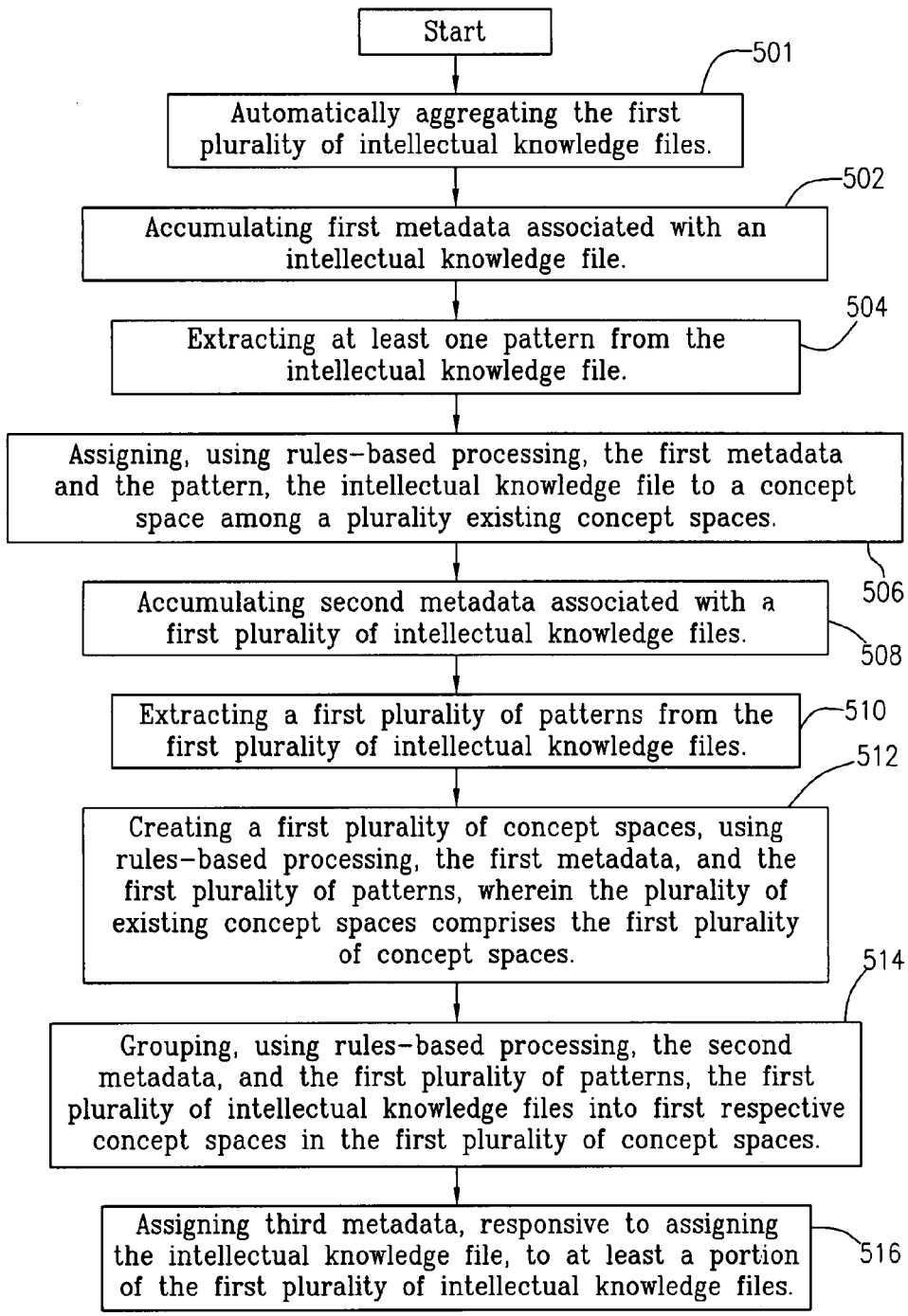
FIGS. 7a and 7b are a flow chart of a present invention method for monitoring innovation activity; and, FIGS. 8 through 25 are screen captures illustrating a present invention system for monitoring innovation activity.
Figure 7B:
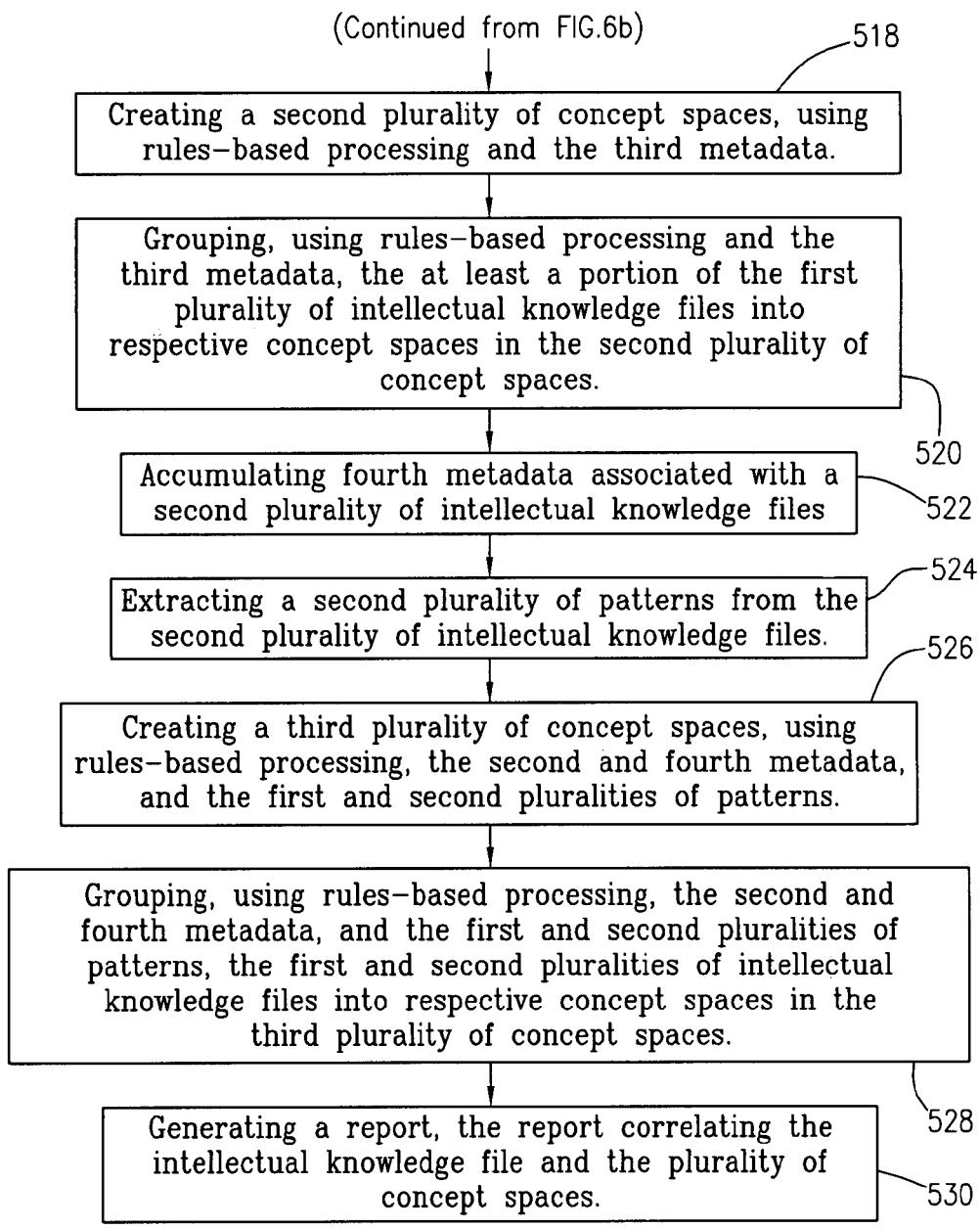

The present invention also includes computer based method 400 for monitoring innovation activity. Although the method in FIG. 6 (and FIG. 7 below) is depicted as a sequence of numbered steps for clarity, no order should be inferred from the numbering unless explicitly stated. The method starts at Step 400. Step 402 accumulates first metadata associated with a first plurality of intellectual knowledge files. Step 404 extract a first plurality of patterns from the first plurality of intellectual knowledge files. Step 406 creates a first plurality of concept spaces, using rules-based processing, the first metadata, and the first patterns. Step 428 groups, using rules-based processing, the first metadata, and the first plurality of patterns, the first plurality of intellectual knowledge files into first respective concept spaces in the first plurality of concept spaces. Step 430 generates a report correlating the first plurality of intellectual knowledge files and the first respective concept spaces.

In some aspects, Step 408 assigns second metadata, responsive to the grouping of the first plurality of intellectual knowledge files, to at least a portion of the first plurality of intellectual knowledge files. Step 410 creates a second plurality of concept spaces, using rules-based processing and the second metadata, and Step 412 groups, using rules-based processing and the second metadata, the at least a portion of the first plurality of intellectual knowledge files into respective concept spaces in the second plurality of concept spaces.

In some aspects, Step 414 accumulates third metadata associated with a second plurality of intellectual knowledge files, Step 416 extracts a second plurality of patterns from the second plurality of intellectual knowledge files, Step 418 creates a third plurality of concept spaces, using rules-based processing, the first and third metadata, and the first and second pluralities of patterns, and Step 420 groups, using rules-based processing, the first and third metadata, and the first and second pluralities of patterns, the first and second pluralities of intellectual knowledge files into respective concept spaces in the third plurality of concept spaces.

In some aspects, Step 422 accumulates fourth metadata associated with an intellectual knowledge file, Step 424 extracts at least one pattern from the intellectual knowledge file, and Step 426 assigns, using rules-based processing, the fourth metadata, and the at least one pattern, the intellectual knowledge file to a concept space in the first plurality of concept spaces. In some aspects, Step 401 automatically aggregates the first plurality of intellectual knowledge files. The steps of method 400 are performed by a general-purpose computer specially programmed to perform the steps.

The present invention also includes computer based method 500 for monitoring innovation activity. The method starts at Step 500. Step 502 accumulates first metadata associated with an intellectual knowledge file. Step 504 extracts at least one pattern from the intellectual knowledge file. Step 506 assigns, using rules-based processing, the first metadata and the pattern, the intellectual knowledge file to a concept space among a plurality of existing concept spaces. Step 530 generates a report, the report correlating the intellectual knowledge file and the plurality of concept spaces.

In some aspects, step 508 accumulates second metadata associated with a first plurality of intellectual knowledge files, Step 510 extracts a first plurality of patterns from the first plurality of intellectual knowledge files, Step 512 creates a first plurality of concept spaces, using rules-based processing, the first metadata, and the first plurality of patterns, wherein the plurality of existing concept spaces comprises the first plurality of concept spaces, and Step 514 groups, using rules-based processing, the second metadata, and the first plurality of patterns, the first plurality of intellectual knowledge files into first respective concept spaces in the first plurality of concept spaces.

In some aspects, Step 516 assigns third metadata, responsive to the assigning the intellectual knowledge file, to at least a portion of the first plurality of intellectual knowledge files, Step 518 creates a second plurality of concept spaces, using rules-based processing and the third metadata, and Step 520 groups, using rules-based processing and the third metadata, the at least a portion of the first plurality of intellectual knowledge files into respective concept spaces in the second plurality of concept spaces.

In some aspects, Step 522 accumulates fourth metadata associated with a second plurality of intellectual knowledge files, Step 524 extracts a second plurality of patterns from the second plurality of intellectual knowledge files, Step 526 creates a third plurality of concept spaces, using rules-based processing, the second and fourth metadata, and the first and second pluralities of patterns, and Step 528 groups, using rules-based processing, the second and fourth metadata, and the first and second pluralities of patterns, the first and second pluralities of intellectual knowledge files into respective concept spaces in the third plurality of concept spaces.

In some aspects, Step 501 automatically aggregates the first plurality of intellectual knowledge files. The steps of method 500 are performed by a general-purpose computer specially programmed to perform the steps.

Figure 8:
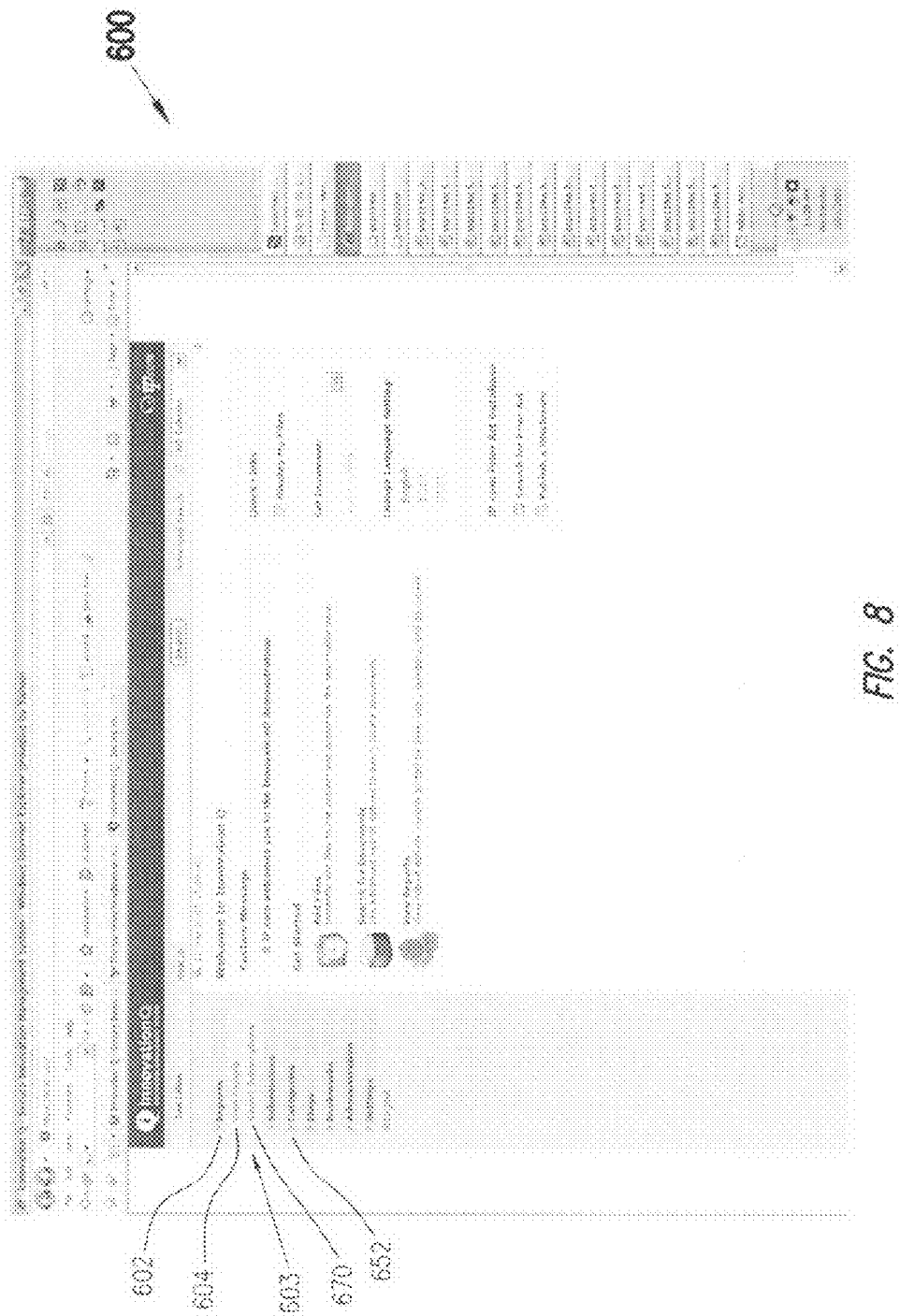
Figure 9:
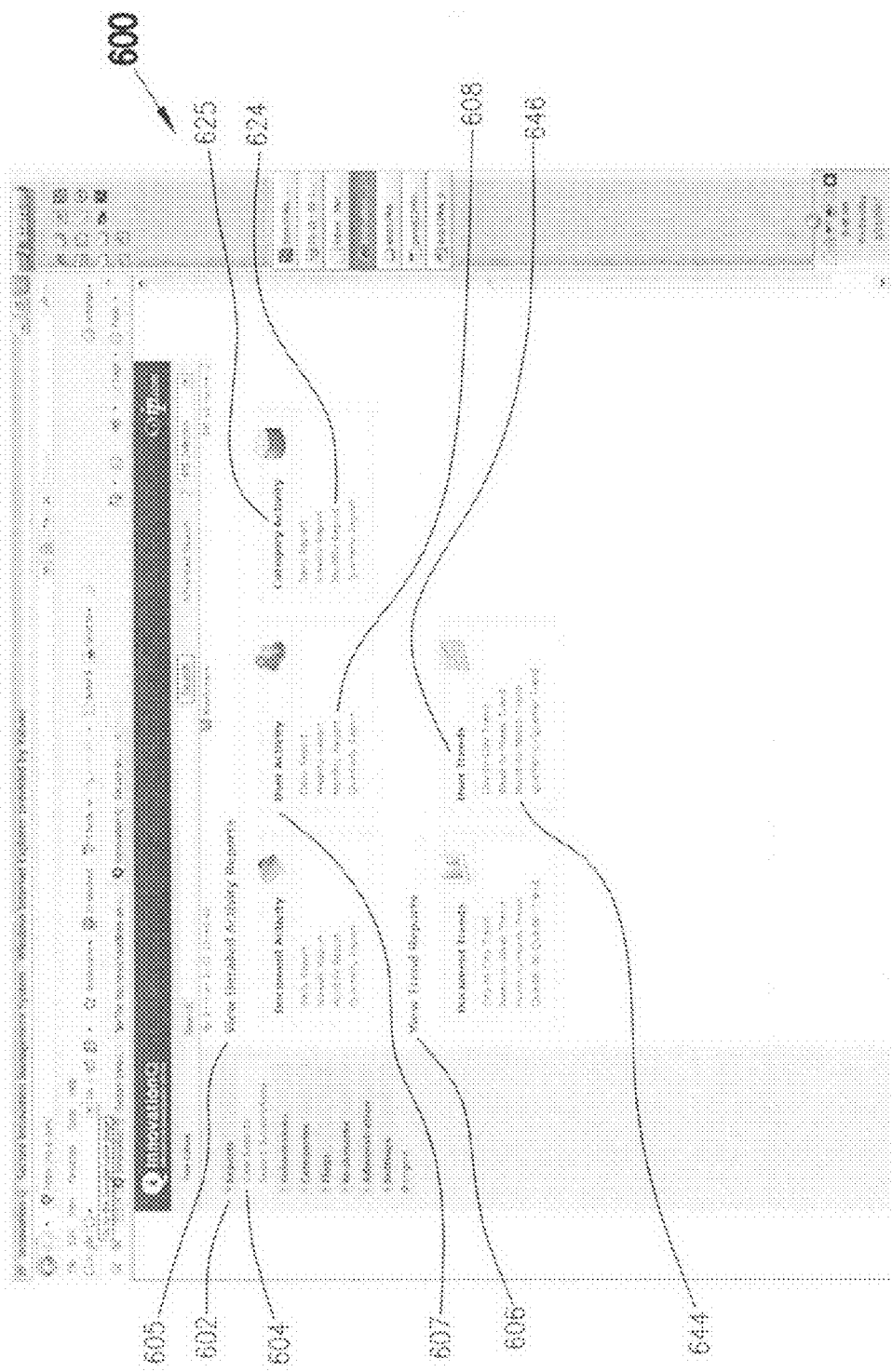
Figure 10:
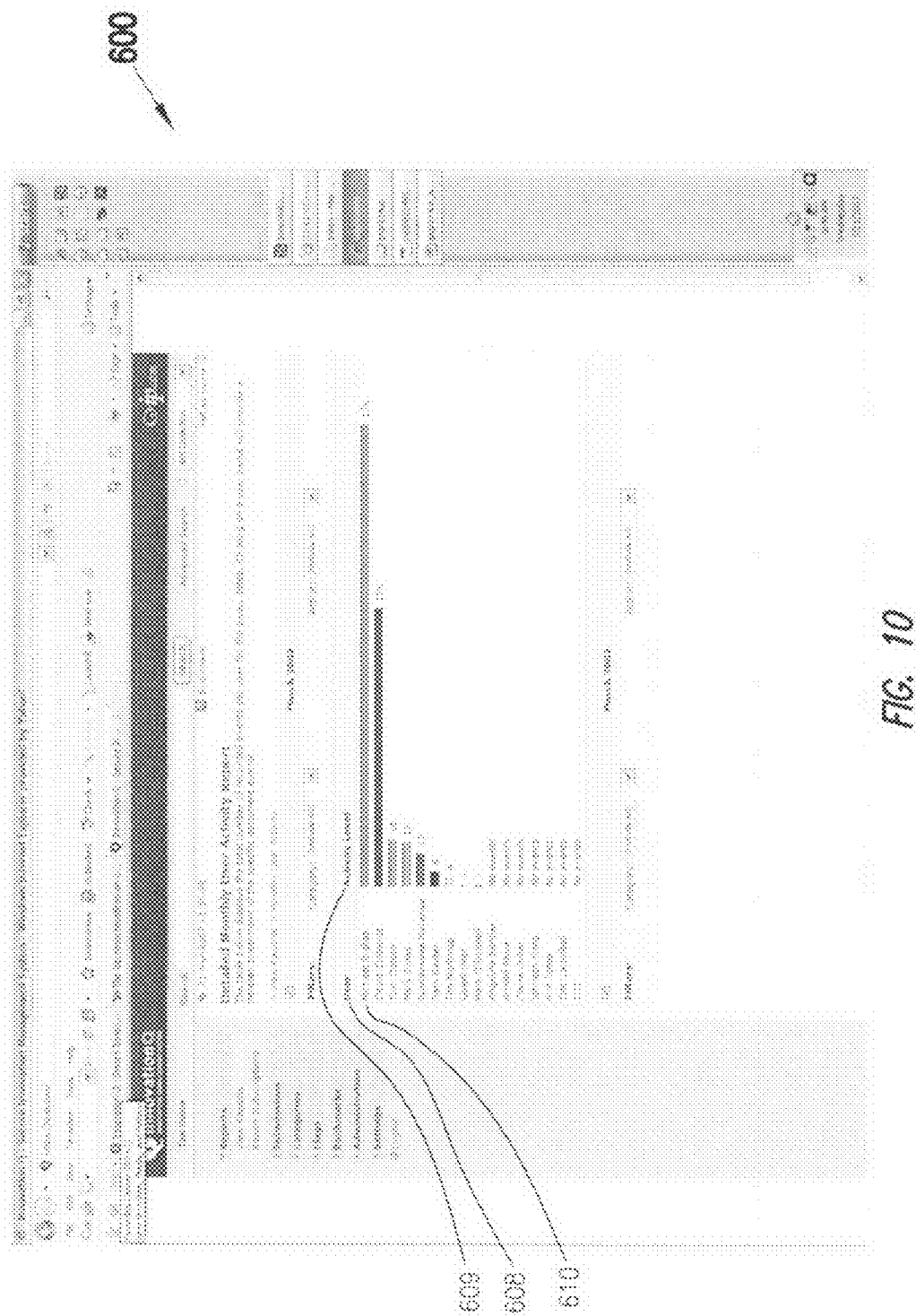
Figure 11:
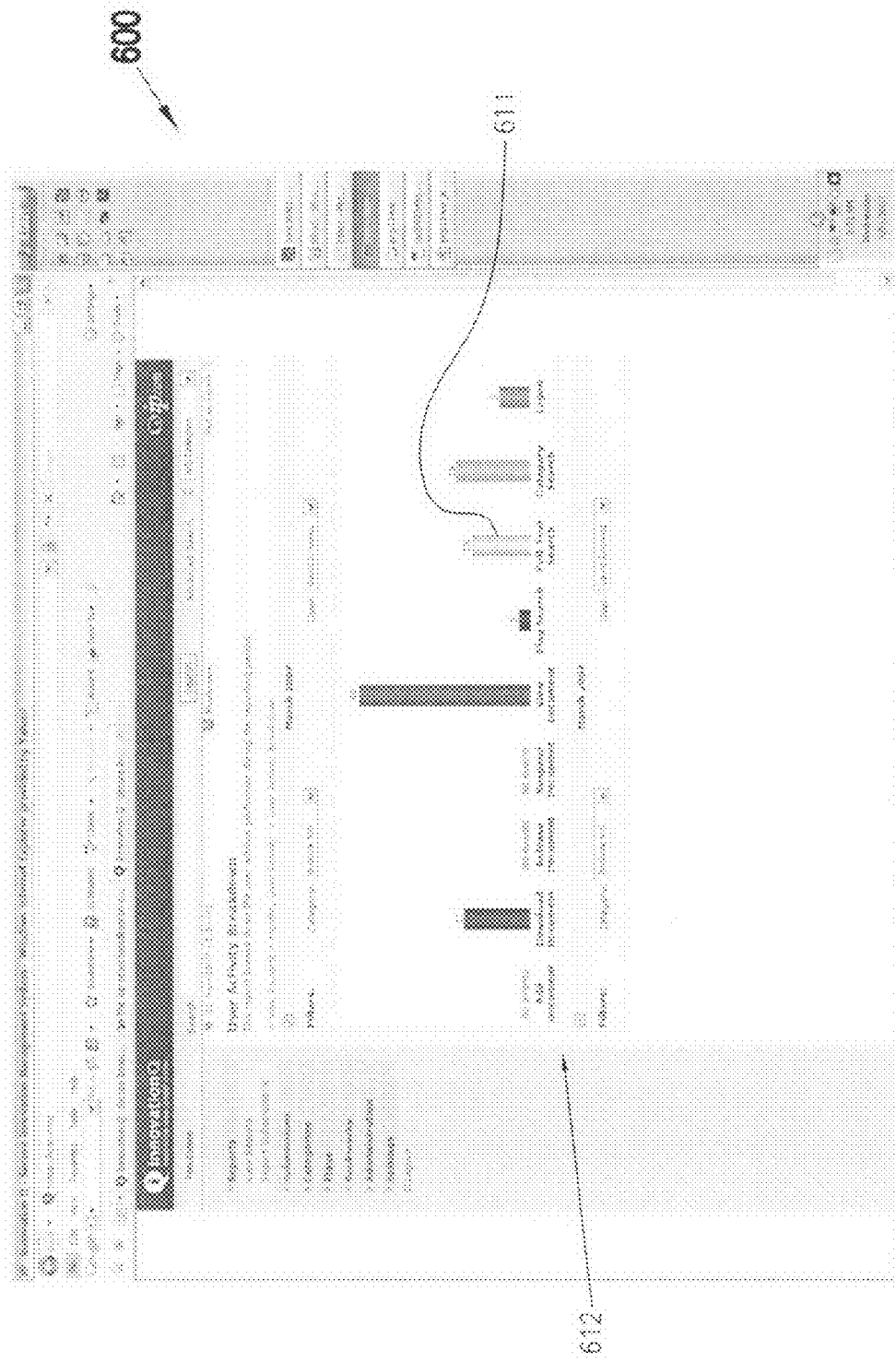

FIGS. 8 through 25 are screen captures illustrating present invention system 600 for monitoring innovation activity. FIG. 8 is a screen capture of a home page for system 600. Options for the system, for example, Reports 602, are listed along the left-hand side of the screen. To use the reporting functionality of the system, button 602 has been selected to activate drop-down menu 603. Two options are shown in menu 603; button 604 View Reports has been selected to generate the screen in FIG. 9. In FIG. 9, there are two categories of reports to view, Detailed Activity Reports 605 and Trend Reports 606. Under 605, there are a series of options, such as, User Activity 607. Monthly Report 608 under heading 607 has been selected to generate the screen in FIG. 10. In FIG. 10, column 608 lists the users currently registered in the system and Activity Level 609 shows the amount of activity associated with each user. For example, 176 activities are shown for user 610. User, 610, has been selected to generate the screen in FIG. 11. FIG. 11 presents a breakdown of the activity for the user selected in FIG. 10. The types of activities being parsed by the system, for example, Full-Text Search 611, are shown along line 612. For each type of activity on line 612, the number of incidents of the activity is shown, for example, 611 shows 15 incidents. 611 has been selected to generate the screen shown in FIG. 12.

Figure 12:
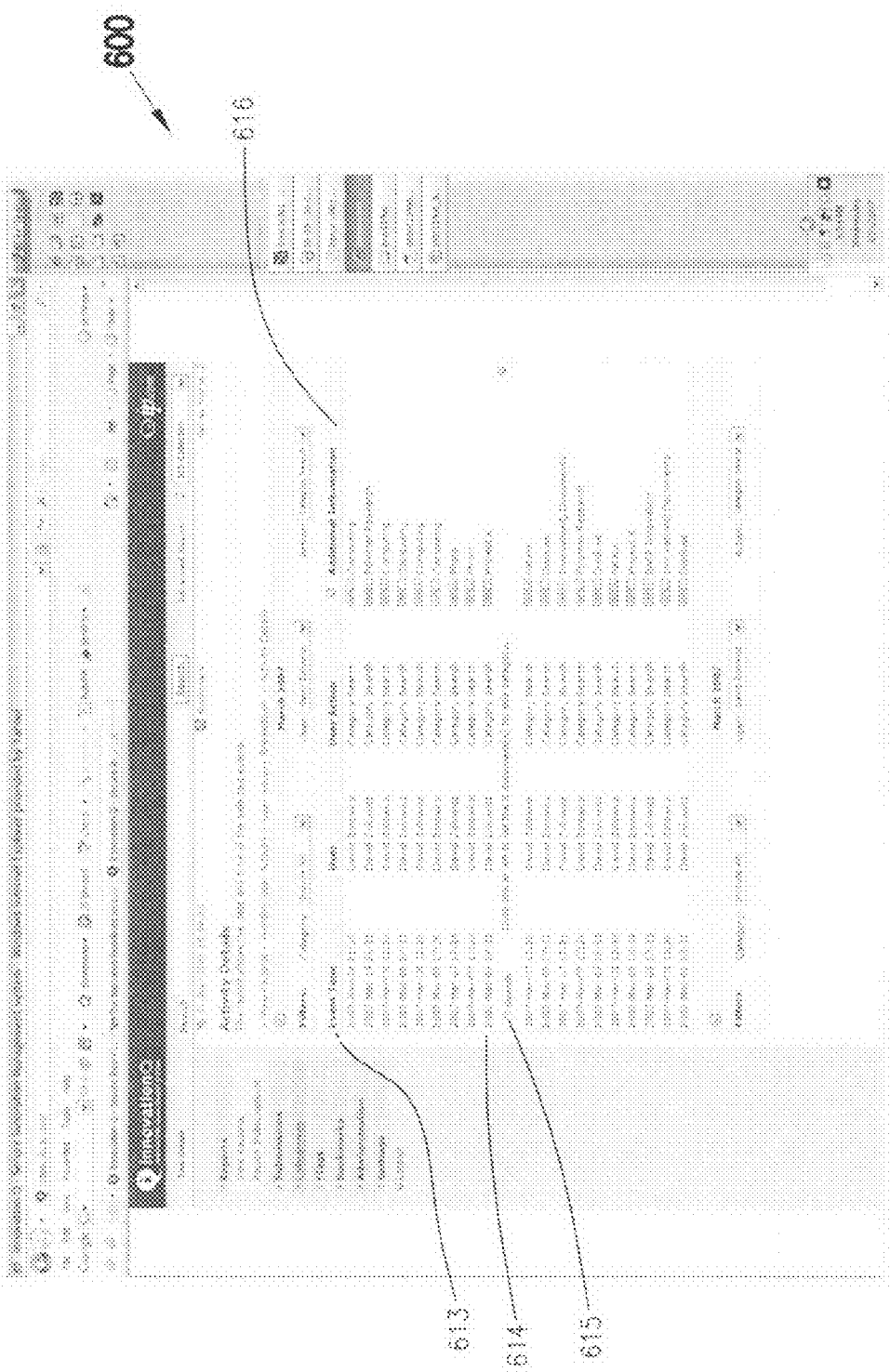
Figure 13:
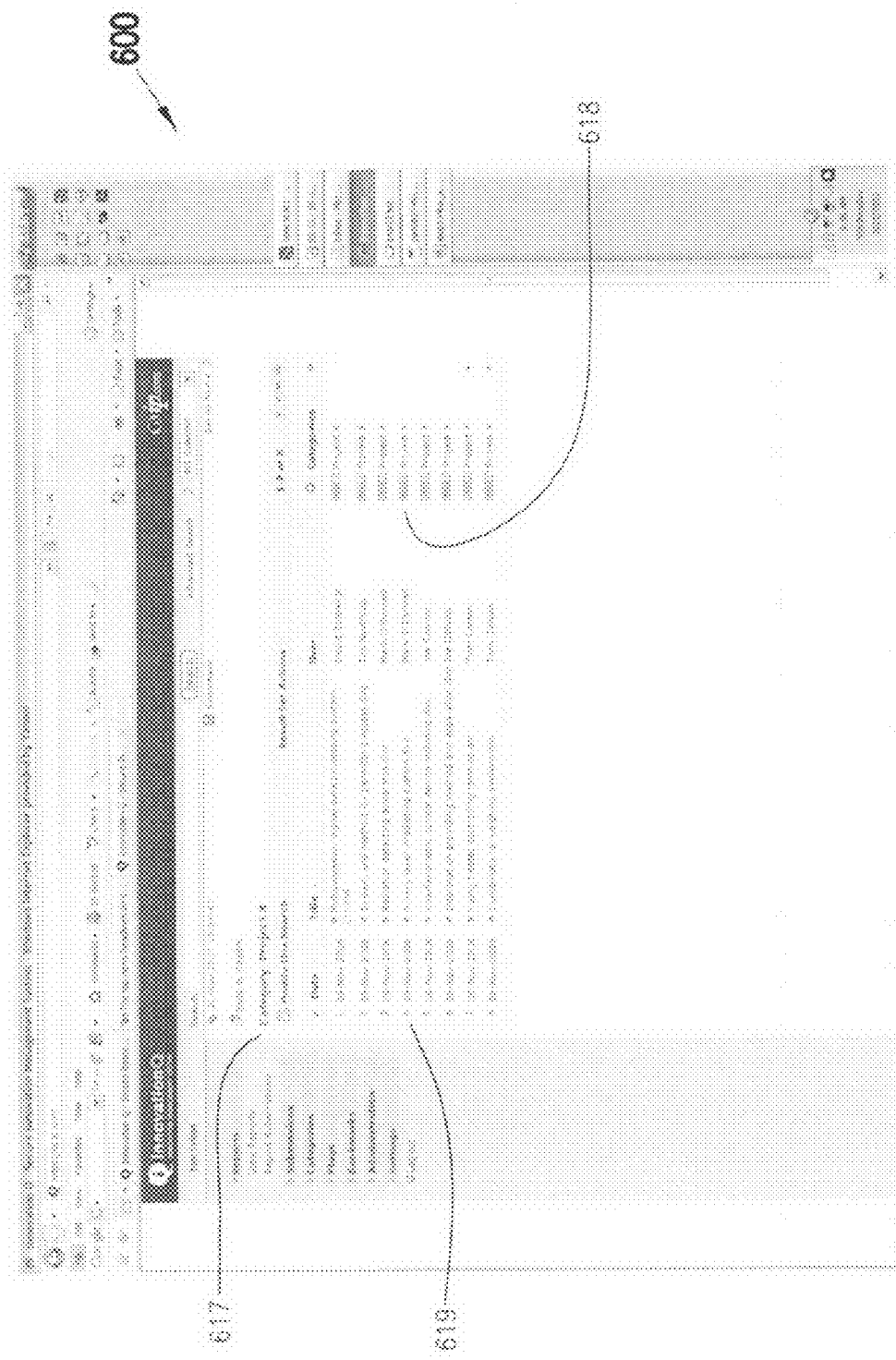
Figure 14:
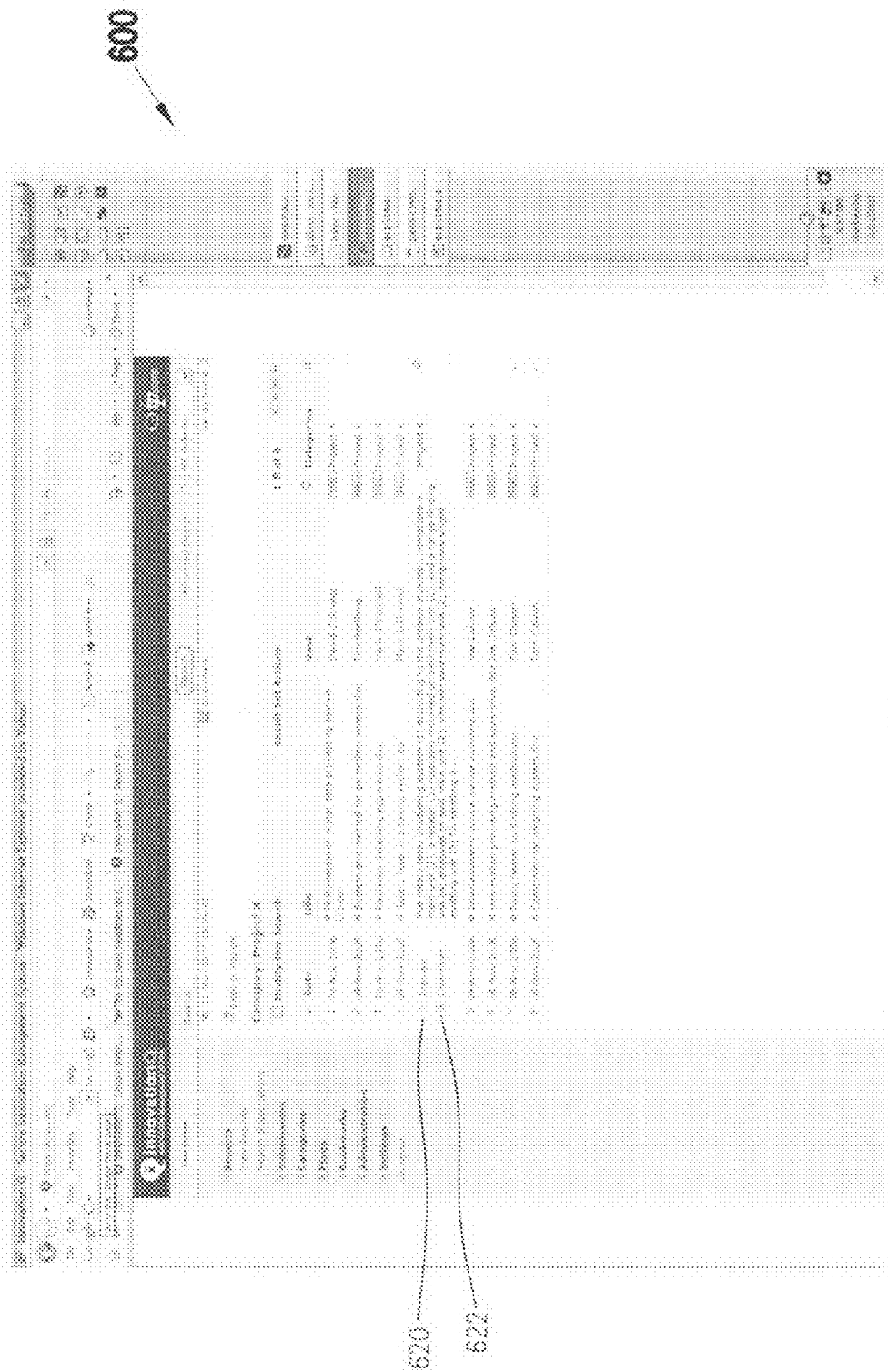

The screen in FIG. 12 presents further detail regarding the activity, Full-Text Search 611, selected in FIG. 11. Parameters associated with the activity, such as Event Time 613, are displayed and each of the 15 activities shown in item 611 of FIG. 11 is broken down in accordance with these parameters. Line 614 has been selected to generate a drop down menu including button 615, which enables a further breakdown of the documents associated with line 614. As noted under Additional Information 616 in FIG. 12, line 615 is associated with "Project X." Button 615 has been selected to generate the screen shown in FIG. 13. FIG. 13 includes Category 617, associated with line 614 in FIG. 12 and shows a breakdown of line 614 from FIG. 12. For example, the documents associated with Project X are listed. Button 618 enables a preview of an item in 617. Button 618 for line 619 has been selected to generate the screen in FIG. 14. Buttons 620 and 622 can be selected to preview or download the item referenced in line 619.

Figure 15:
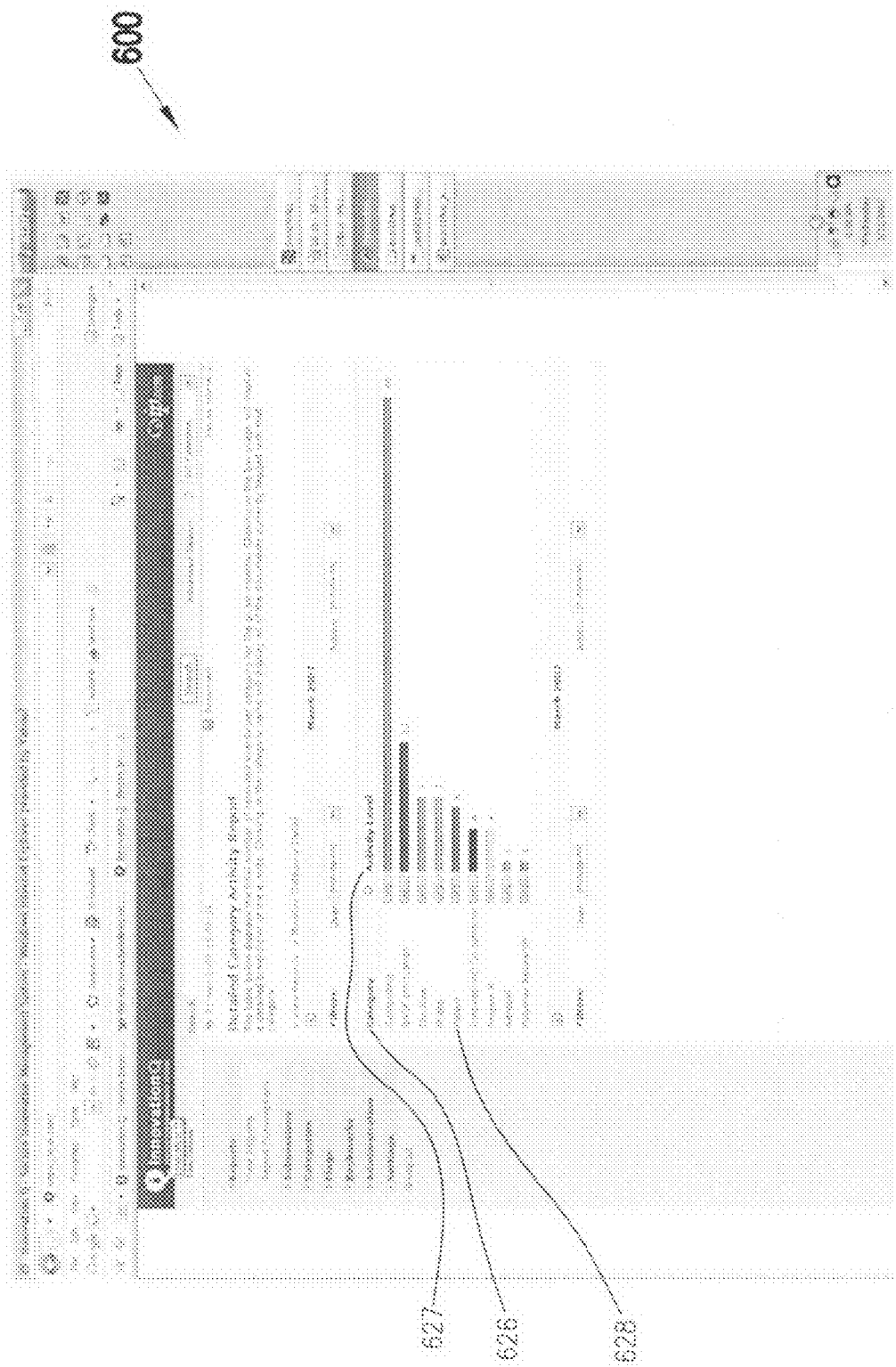
Figure 16:
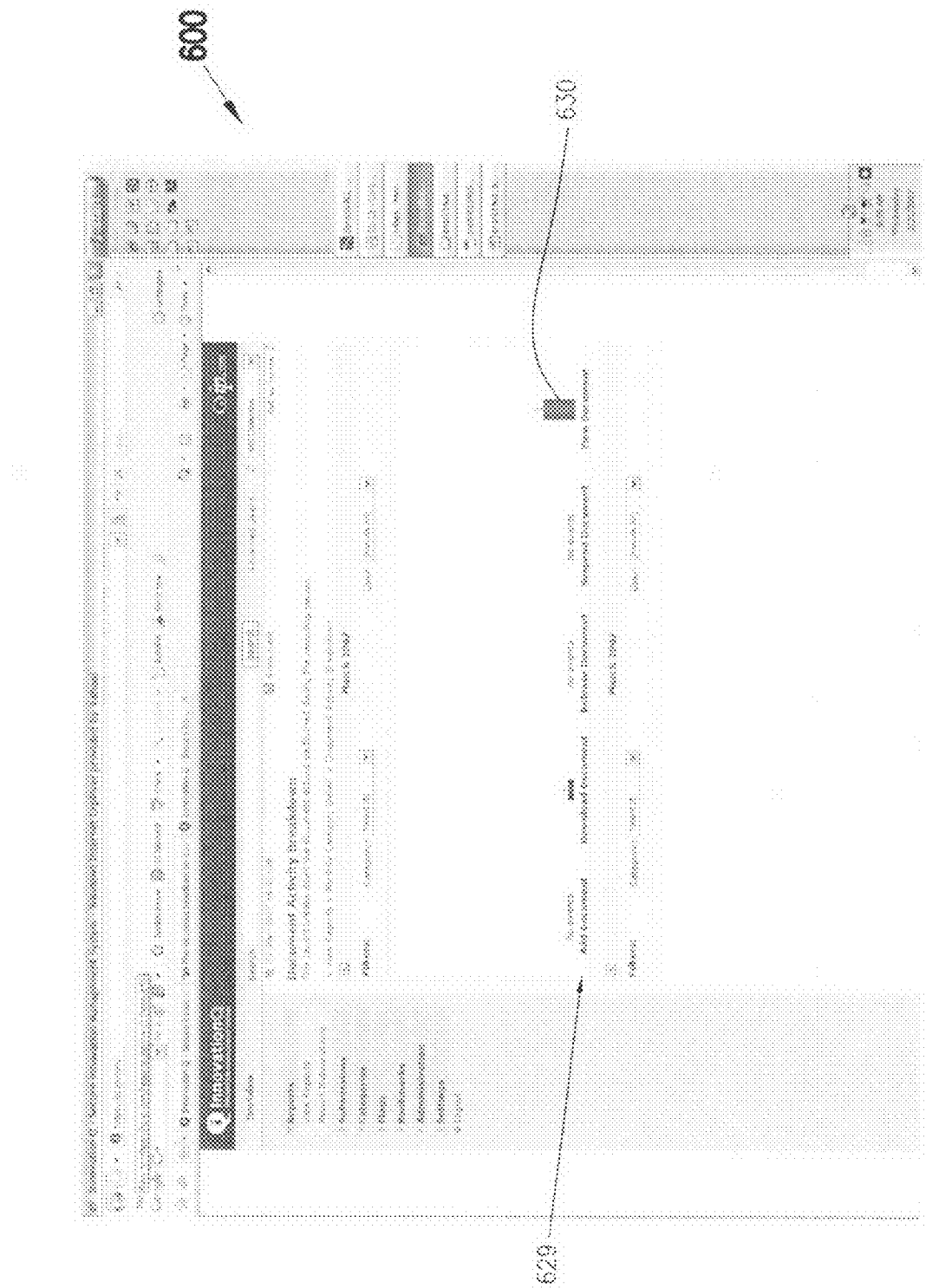
Figure 17:
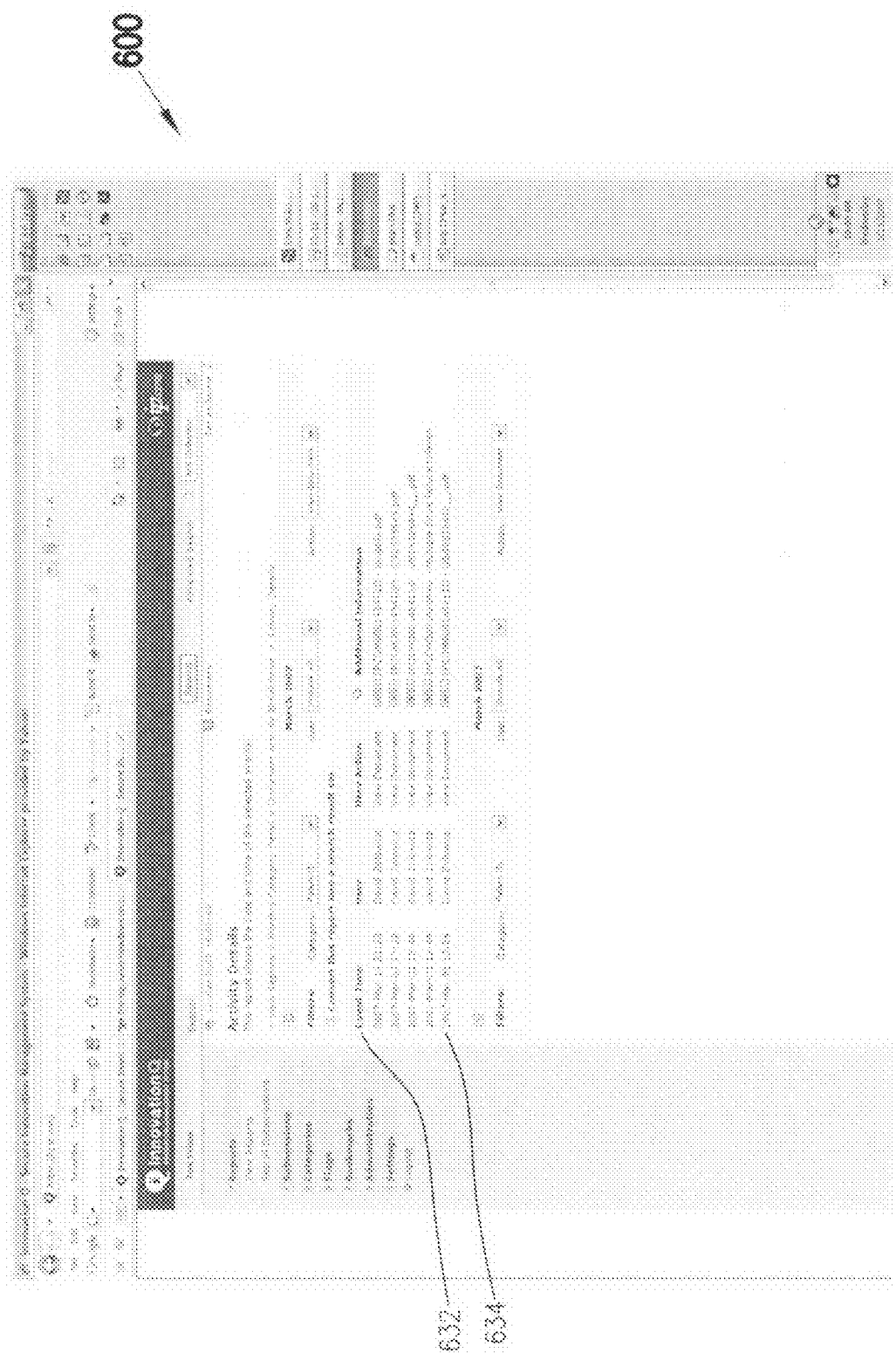
Figure 18:
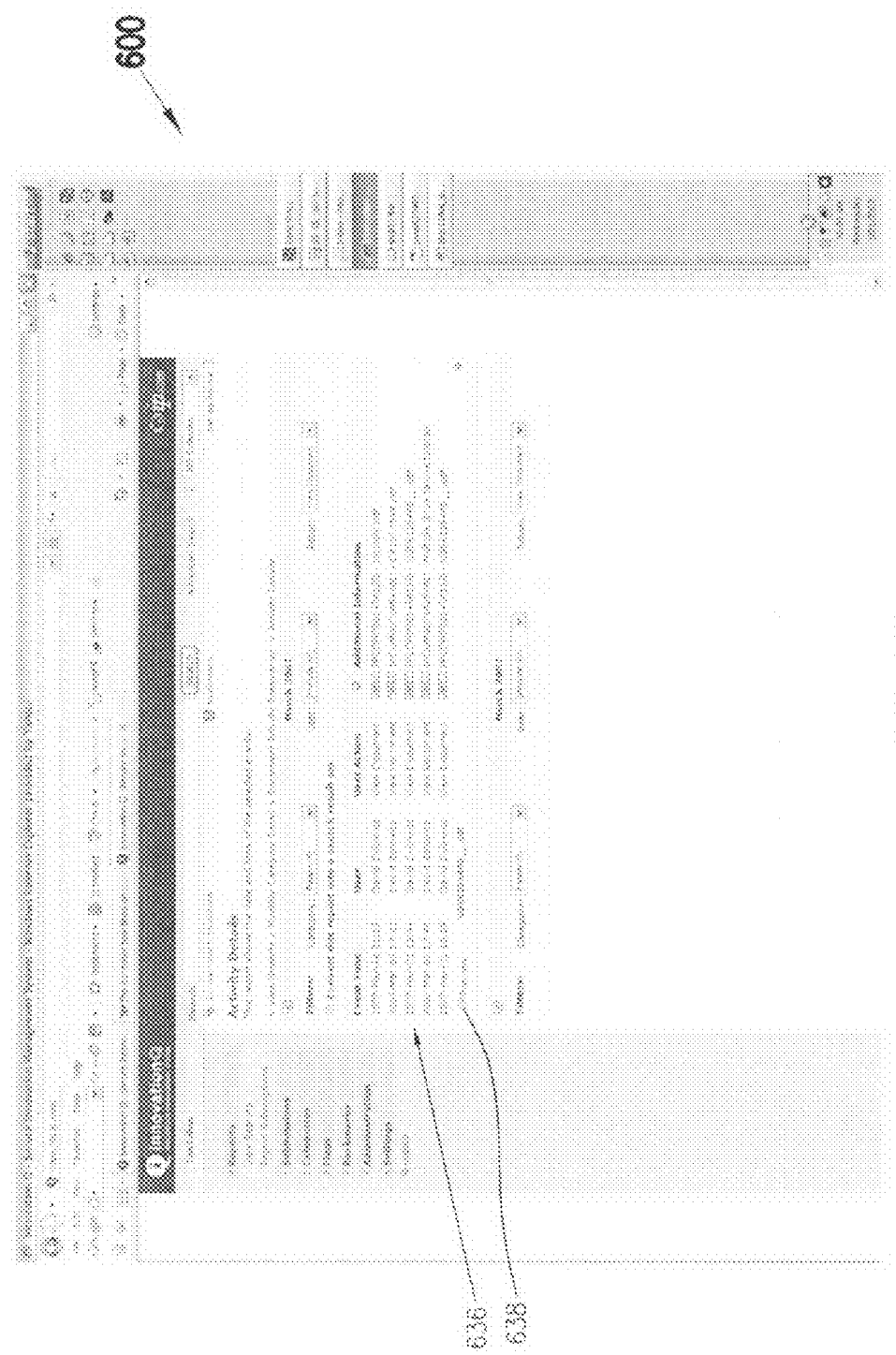
Figure 19:
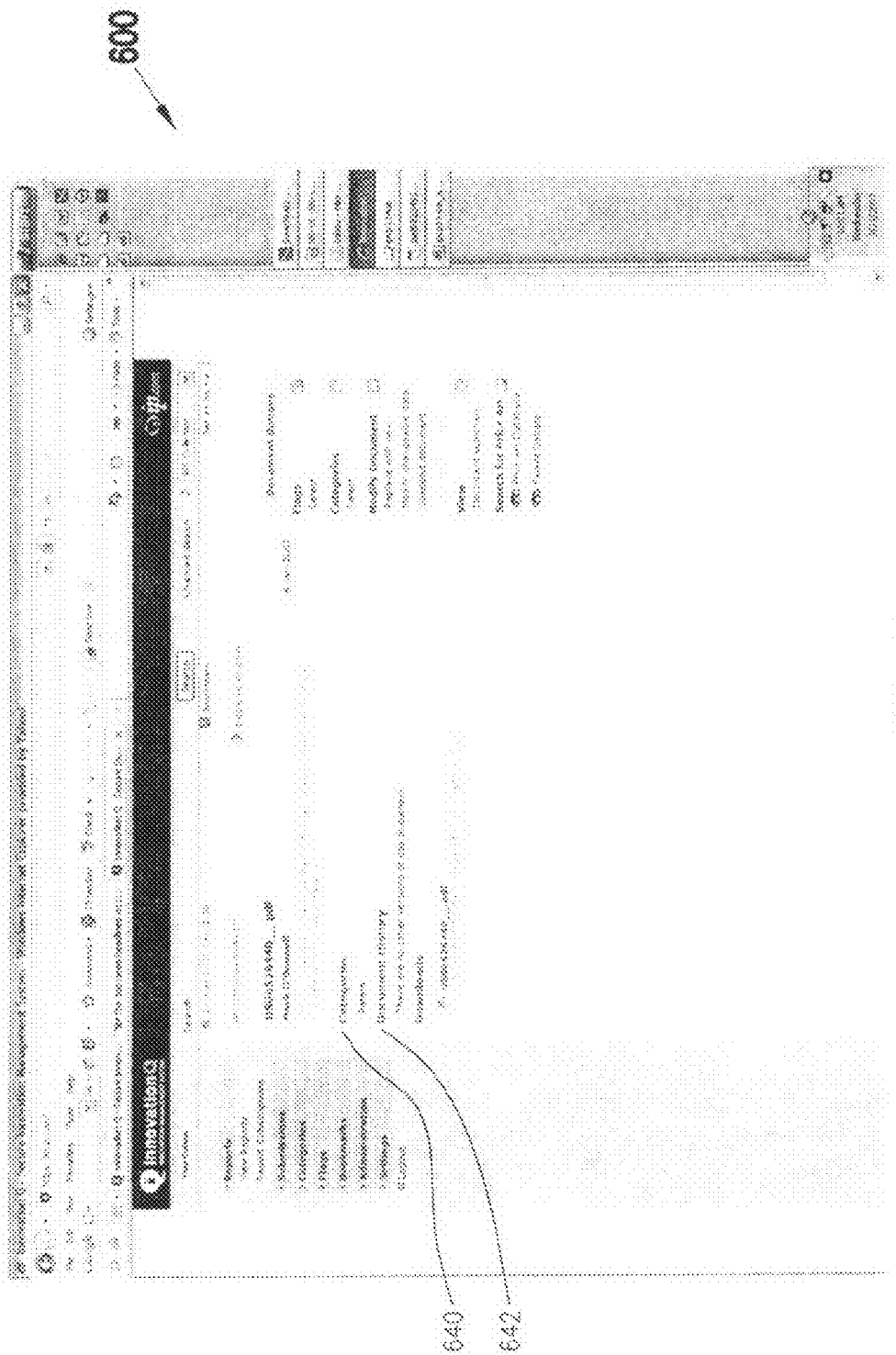

To generate the screen shown in FIG. 15, line 624 in FIG. 9 has been selected. Line 624 is one of several options listed under Category Activity 625. Category Activity 625 is one of the options for viewing detailed activity reports. In FIG. 15, Category 626 and Activity Level 627 are used to break down category activity. To obtain further details of a line listing under 626 and 627, line 628, in this case, "Patents," has been selected to generate the screen in FIG. 16. Note that a numerical value is shown under 627, for example, 6 activities are shown for line 628. In FIG. 16, the line selected in FIG. 15 is further broken down. For example, types of document activities are listed on line 629. To generate the screen shown in FIG. 17, View Document 630, a category of activity, has been selected. In FIG. 17, the 5 View Documents activities shown in 630 of FIG. 16 are listed and detailed according to parameters such as Event Time 632. Line 634 has been selected to generate the screen shown in FIG. 18. Selecting 634 in FIG. 17 activates drop down menu 636. Menu 636 includes Preview button 638, which has been selected to generate the screen shown in FIG. 19. In FIG. 19, further details of line 634 in FIG. 17 are presented, for example, Categories 640 and Document History 642.

Figure 20:
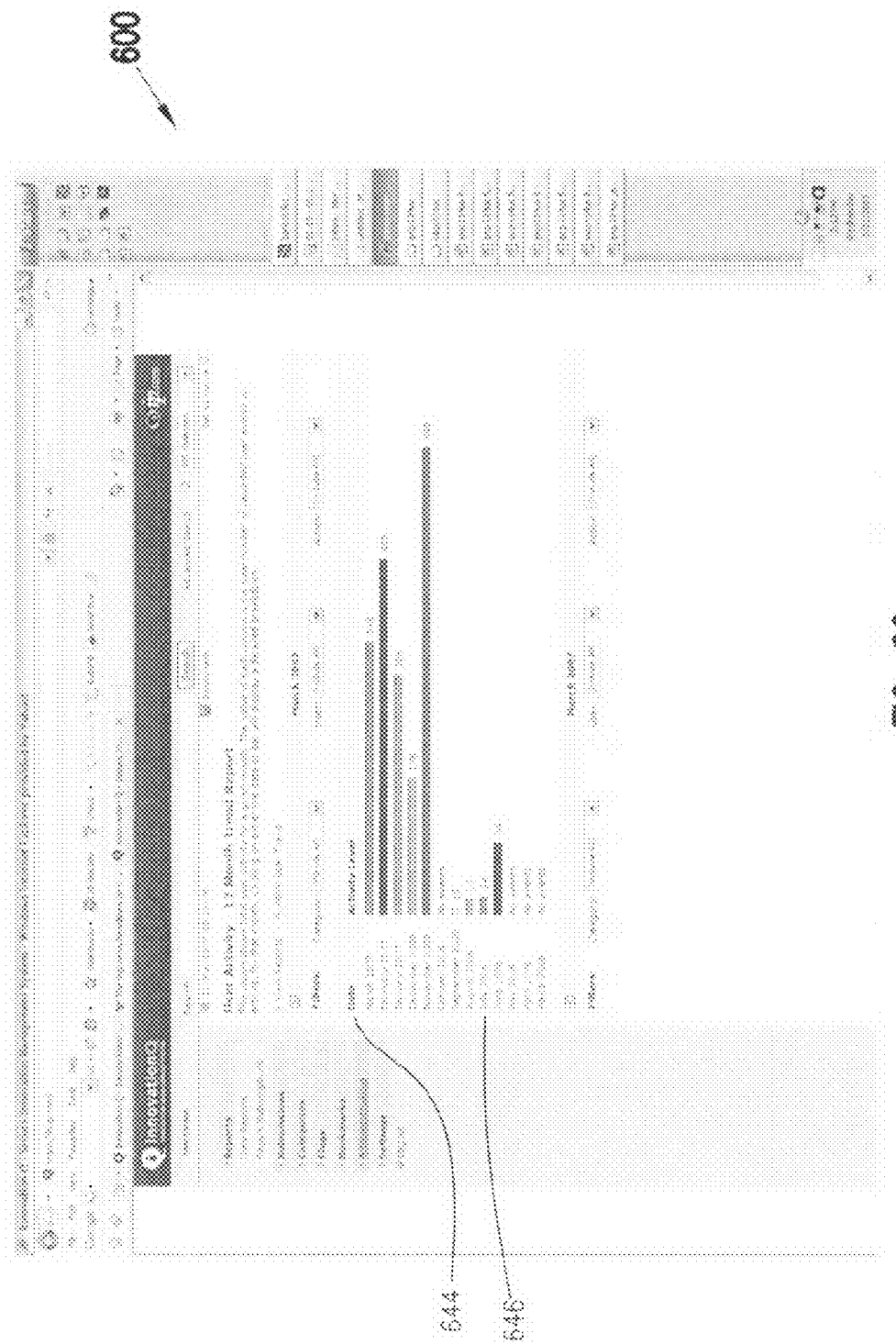
Figure 21:
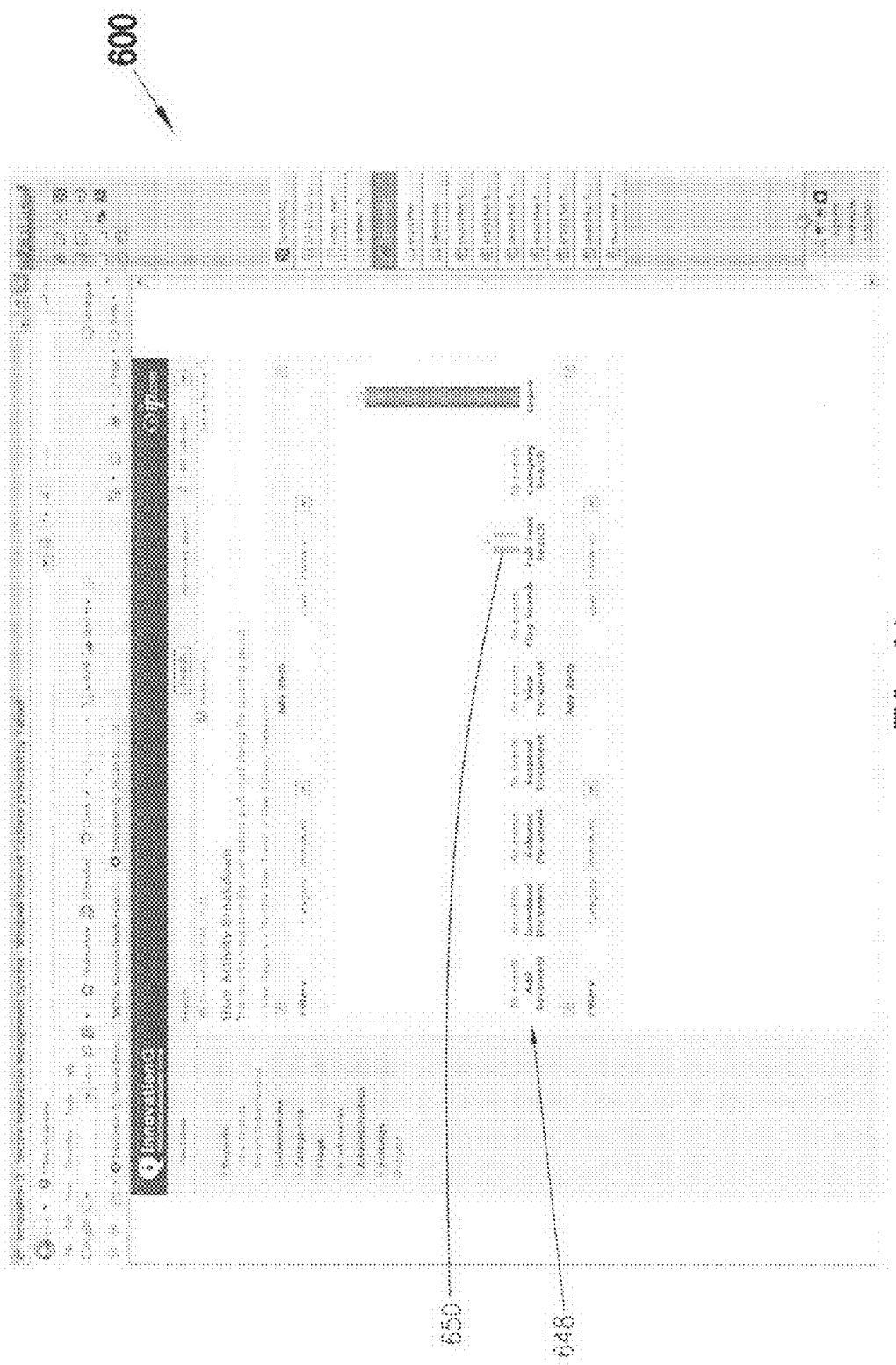

To show an example of a Trends Report 606, line 644, Month-to-Month Trend has been selected in FIG. 9 to generate the screen shown in FIG. 20. In FIG. 20, user activity trends are shown according to parameters such as Date 644, in this case, by the month. A numerical value for each time period also is shown, for example, 24 activities are shown for line 646, July. To obtain further details, a month can be selected. For example, line 646 has been selected to generate the screen shown in FIG. 21. In FIG. 21, the activities for July are shown in accordance with parameters on line 648, for example, Full-Text Search 650. In a manner similar to that shown for the User Activity 607 and Category Activity 625, further detail can be obtained for items shown on line 648.

Figure 22:
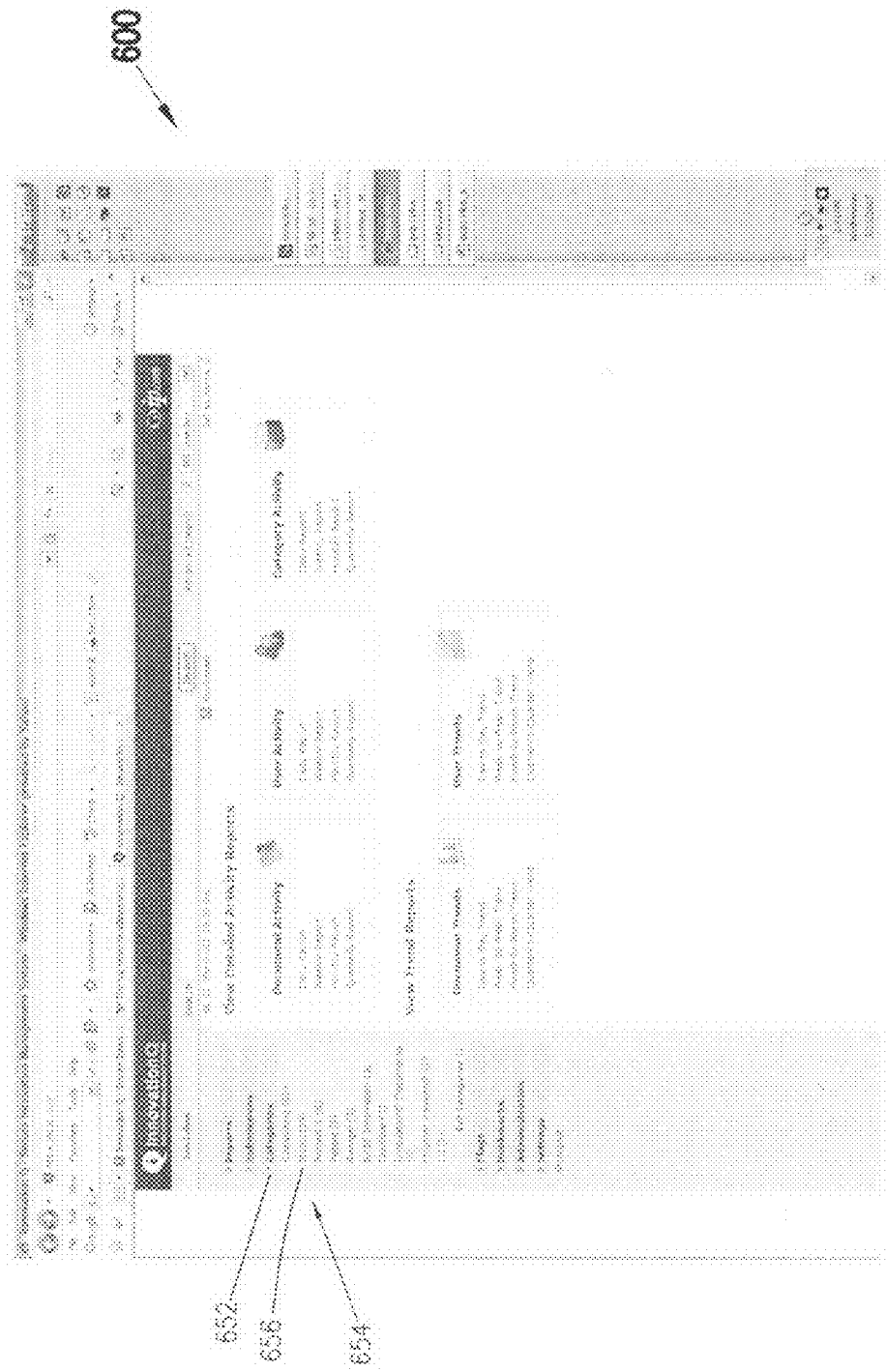
Figure 23:
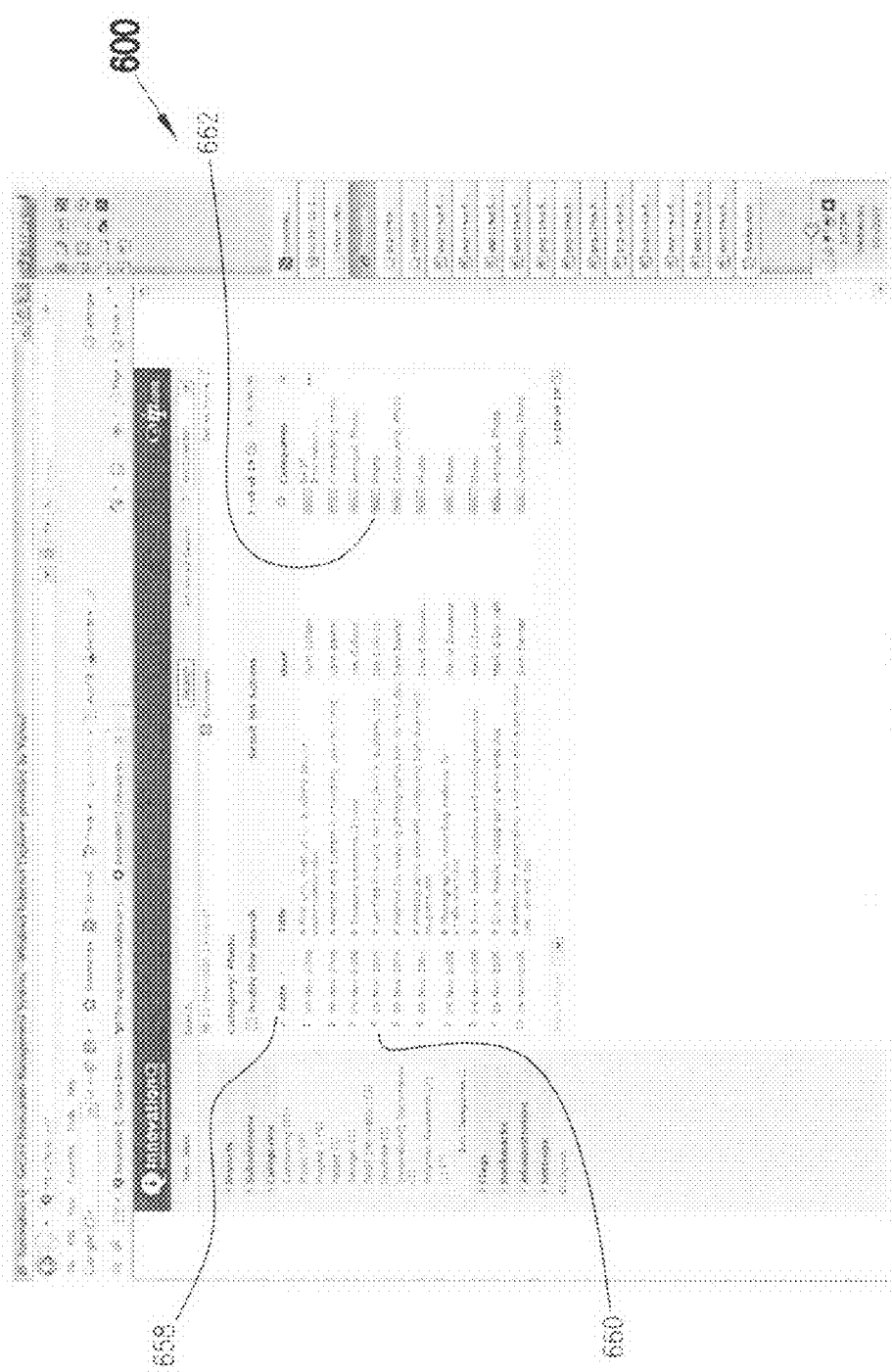
Figure 24:
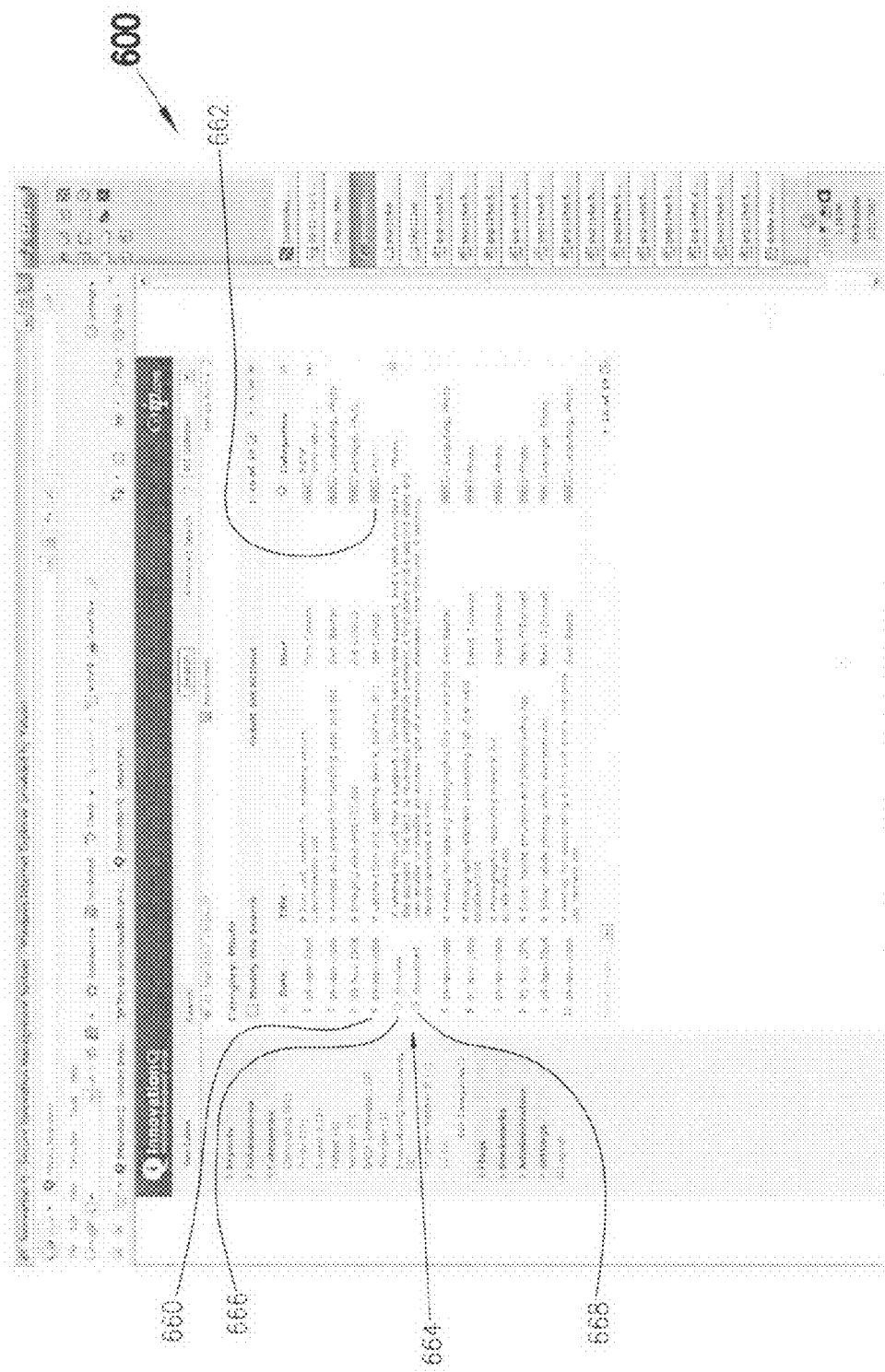
Figure 25:
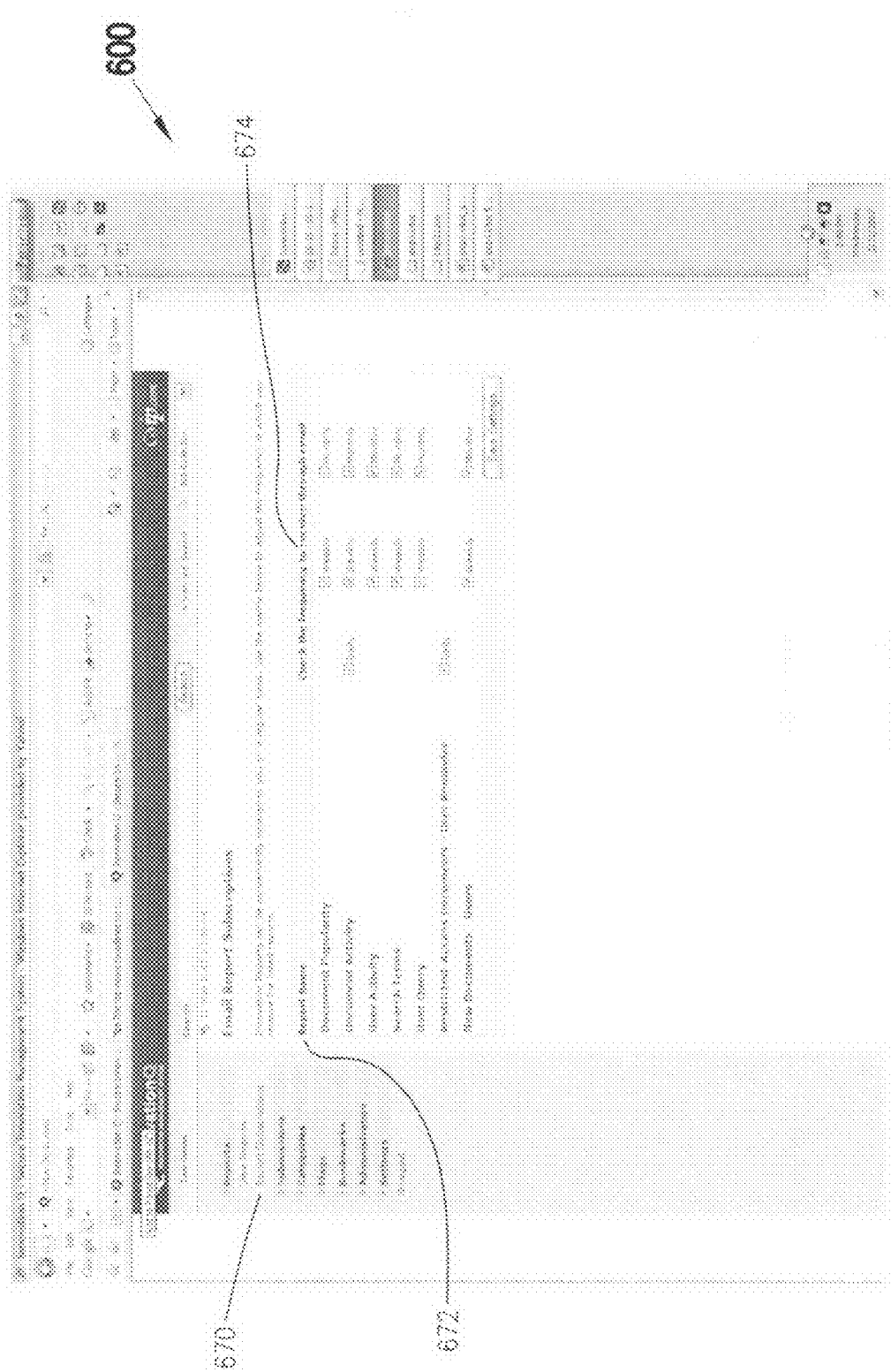

To generate the screen shown in FIG. 22, button 652 in FIG. 8 has been selected, enabling drop-down menu 654. Menu 654 lists the categories currently in place in system 600. These categories can be edited from this screen. Further details are available about each category shown in 654. For example, line 656 Photo has been selected to generate the screen shown in FIG. 23. Screen 23 lists the activities associated with the category, Photo, shown on line 656. The activities are detailed according to parameters such as Date 658. To obtain further details regarding the activity shown on line 660, button 662 has been selected, generating the screen shown in FIG. 24. Drop down menu 664 is activated in response to selecting button 662 in FIG. 23. From this menu, the item in line 660 can be previewed or downloaded using buttons 666 and 668, respectively. The screen shown in FIG. 25 was generated by selecting line 670 in FIG. 8. Using the subscription option of line 670, report information can be parsed according to categories such as Report Name 672 and sent to users according to frequencies shown under heading 674.

It should be understood that only some of the operations of system 600 have been described above. It also should be understood that a present invention system for monitoring innovation activity is not limited to the configurations and operations shown for system 600.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A computer based method for monitoring innovation activity, comprising:
    accumulating first metadata associated with a first plurality of intellectual knowledge files;
    extracting a first plurality of patterns from said first plurality of intellectual knowledge files;
    creating a first plurality of concept spaces, using rules-based processing, said first metadata, and said first patterns;
    grouping, using rules-based processing, said first metadata, and said first plurality of patterns, said first plurality of intellectual knowledge files into first respective concept spaces in said first plurality of concept spaces; and,
    generating a report, said report correlating said first plurality of intellectual knowledge files and said first respective concept spaces, wherein said steps of accumulating, extracting, creating, grouping, and generating are performed by a general-purpose computer specially programmed to perform said steps of accumulating, extracting, creating, grouping, and generating.

2. The method of claim 1 further comprising:
    assigning second metadata, responsive to said grouping of said first plurality of intellectual knowledge files, to at least a portion of said first plurality of intellectual knowledge files;
    creating a second plurality of concept spaces, using rules-based processing and said second metadata; and,
    grouping, using rules-based processing and said second metadata, said at least a portion of said first plurality of intellectual knowledge files into respective concept spaces in said second plurality of concept spaces, wherein said steps of assigning, creating, and grouping are performed by said general-purpose computer.

3. The method of claim 1 further comprising:
    accumulating third metadata associated with a second plurality of intellectual knowledge files;
    extracting a second plurality of patterns from said second plurality of intellectual knowledge files;
    creating a third plurality of concept spaces, using rules-based processing, said first and third metadata, and said first and second pluralities of patterns; and,
    grouping, using rules-based processing, said first and third metadata, and said first and second pluralities of patterns, said first and second pluralities of intellectual knowledge files into respective concept spaces in said third plurality of concept spaces, wherein said steps of accumulating, extracting, creating, and grouping are performed by said general-purpose computer.

4. The method of claim 1 further comprising:
    accumulating fourth metadata associated with an intellectual knowledge file;
    extracting at least one pattern from said intellectual knowledge file, and,
    assigning, using rules-based processing, said fourth metadata, and said at least one pattern, said intellectual knowledge file to a concept space in said first plurality of concept spaces, wherein said steps of accumulating, extracting, and assigning are performed by said general-purpose computer.

5. The method of claim 1 further comprising automatically aggregating said first plurality of intellectual knowledge files, said automatic aggregating performed by said general-purpose computer.

6. A method for monitoring innovation activity, comprising:
- accumulating first metadata associated with an intellectual knowledge file;
- extracting at least one pattern from said intellectual knowledge file;
- assigning, using rules-based processing, said first metadata and said at least one pattern, said intellectual knowledge file to a concept space among a plurality of existing concept spaces; and,
- generating a report, said report correlating said intellectual knowledge file and said plurality of concept spaces, wherein said steps of accumulating, extracting, assigning, and generating are performed by a general-purpose computer specially programmed to perform said steps of accumulating, extracting, assigning, and generating.

7. The method of claim 6 further comprising:
- accumulating second metadata associated with a first plurality of intellectual knowledge files;
- extracting a first plurality of patterns from said first plurality of intellectual knowledge files;
- creating a first plurality of concept spaces, using rules-based processing, said first metadata, and said first plurality of patterns, wherein said plurality of existing concept spaces comprises said first plurality of concept spaces; and,
- grouping, using rules-based processing, said second metadata, and said first plurality of patterns, said first plurality of intellectual knowledge files into first respective concept spaces in said first plurality of concept spaces, wherein said steps of accumulating, extracting, creating, and grouping, are performed by said general-purpose computer.

8. The method of claim 7 further comprising:
- assigning third metadata, responsive to said assigning said intellectual knowledge file, to at least a portion of said first plurality of intellectual knowledge files;
- creating a second plurality of concept spaces, using rules-based processing and said third metadata; and,
- grouping, using rules-based processing and said third metadata, said at least a portion of said first plurality of intellectual knowledge files into respective concept spaces in said second plurality of concept spaces, wherein said steps of assigning, creating, and grouping are performed by said general-purpose computer.

9. The method of claim 7 further comprising:
- accumulating fourth metadata associated with a second plurality of intellectual knowledge files;
- extracting a second plurality of patterns from said second plurality of intellectual knowledge files;
- creating a third plurality of concept spaces, using rules-based processing, said second and fourth metadata, and said first and second pluralities of patterns; and,
- grouping, using rules-based processing, said second and fourth metadata, and said first and second pluralities of patterns, said first and second pluralities of intellectual knowledge files into respective concept spaces in said third plurality of concept spaces, wherein said steps of accumulating, extracting, creating, and grouping are performed by said general-purpose computer.

10. The method of claim 7 further comprising automatically aggregating said first plurality of intellectual knowledge files, said automatic aggregating performed by said general-purpose computer.

11. A computer based system for monitoring innovation activity, comprising:
- a first metadata element arranged to accumulate first metadata associated with a first plurality of intellectual knowledge files;
- a rules-based processor arranged to:
    - extract a first plurality of patterns from said first plurality of intellectual knowledge files;
    - create a first plurality of concept spaces using said first metadata, said first plurality of patterns, and said first plurality of knowledge files; and,
    - group, using said first metadata and said first plurality of patterns, said first plurality of intellectual knowledge files into first respective concept spaces in said first plurality of concept spaces; and,
- a report generator arranged to correlate said first plurality of intellectual knowledge files and said first respective concept spaces, wherein said first metadata element, said processor, and said report generator are located in at least one specially programmed general-purpose computer.

12. The system of claim 11 further comprising a second metadata element arranged to assign second metadata, responsive to said grouping of said first plurality of intellectual knowledge files, to at least a portion of said first plurality of intellectual knowledge files and wherein said rules-based processor is arranged to:
- create a second plurality of concept spaces using said second metadata; and,
- group, using said second metadata, said at least a portion of said first plurality of intellectual knowledge files into respective concept spaces in said second plurality of concept spaces, wherein said second metadata element is located in said at least general-purpose computer.

13. The system of claim 11 further comprising a third metadata element arranged to accumulate third metadata associated with a second plurality of intellectual knowledge files and wherein said rules-based processor is arranged to:
- extract a second plurality of patterns from said second plurality of intellectual knowledge files;
- create a third plurality of concept spaces using said first and third metadata and said first and second pluralities of patterns; and,
- group, using said first and third metadata and said first and second pluralities of patterns, said first and second pluralities of intellectual knowledge files into respective concept spaces in said third plurality of concept spaces, wherein said third metadata element is located in said at least general-purpose computer.

14. The system of claim 11 further comprising a fourth metadata element arranged to accumulate fourth metadata associated with a second plurality of intellectual knowledge files and wherein said rules-based processor is arranged to:
- extract at least one pattern from said intellectual property file; and,
- assign, using said fourth metadata and said at least one pattern, said intellectual knowledge file to a concept space in said first plurality of concept spaces, wherein said fourth metadata element is located in said at least general-purpose computer.

15. The system of claim 11 further comprising an aggregator element arranged to automatically aggregate said first plurality of intellectual knowledge files, said aggregator located in said general-purpose computer.

16. A system for monitoring innovation activity, comprising:
- a first metadata element arranged to accumulate first metadata associated with an intellectual knowledge file;
- a first rules-based processor arranged to:
  - extract at least one pattern from said intellectual knowledge file; and,
  - assign, using said first metadata and said at least one pattern, said intellectual knowledge file to a concept space among a plurality of existing concept spaces; and,
- a report generator arranged to generate a report correlating said intellectual knowledge file and said plurality of existing concept spaces, wherein said first metadata element, said first rules-based processor, and said report generator are located in at least one specially programmed general-purpose computer.

17. The system of claim 16 further comprising a second metadata element arranged to accumulate second metadata associated with a first plurality of intellectual knowledge files and wherein said rules-based processor is arranged to:
- extract a first plurality of patterns from said first plurality of intellectual knowledge files;
- create a first plurality of concept spaces, using said second metadata and said first plurality of patterns, wherein said plurality of existing concept spaces comprises said first plurality of concept spaces; and,
- group, using said second metadata and said first plurality of patterns, said first plurality of intellectual knowledge files into first respective concept spaces in said first plurality of concept spaces, wherein said second metadata element is located in said at least one general-purpose computer.

18. The system of claim 17 wherein said rules-based processor is arranged to:
- assign third metadata, responsive to said assigning said intellectual knowledge file by said first rules-based processor, to at least a portion of said first plurality of intellectual knowledge files;
- create a second plurality of concept spaces using said third metadata; and,
- group, using said third metadata, said at least a portion of said first plurality of intellectual knowledge files into respective concept spaces in said second plurality of concept spaces.

19. The system of claim 17 wherein said rules-based processor is arranged to:
- accumulate fourth metadata associated with a second plurality of intellectual knowledge files;
- extract a second plurality of patterns from said second plurality of intellectual knowledge files;
- create a third plurality of concept spaces, using said fourth metadata and said second plurality of patterns; and,
- group, using said second and fourth metadata and said first and second pluralities of patterns, said first and second pluralities of intellectual knowledge files into respective concept spaces in said third plurality of concept spaces.

20. The system of claim 17 further comprising an aggregator element arranged to automatically aggregate said first plurality of intellectual knowledge files, said aggregator element located in said general-purpose computer.

21. A computer based method for monitoring innovation activity, comprising:
- accumulating first metadata associated with a plurality of intellectual knowledge files;
- extracting a plurality of patterns from said plurality of intellectual knowledge files;
- creating a plurality of concept spaces, using rules-based processing, said first metadata, and said plurality of patterns;
- grouping, using rules-based processing, said first metadata, and said plurality of patterns, said plurality of intellectual knowledge files into respective concept spaces in said plurality of concept spaces;
- accumulating second metadata associated with an intellectual knowledge file;
- extracting at least one pattern from said intellectual knowledge file;
- assigning, using rules-based processing, said second metadata and said at least one pattern, said intellectual knowledge file to a concept space among said plurality of concept spaces; and,
- generating a report, said report correlating said plurality of intellectual knowledge files and said intellectual knowledge file with said plurality of concept spaces, wherein said steps of accumulating first and second metadata, extracting a plurality of patterns, creating, grouping, extracting at least one pattern, assigning, and generating are performed by a general-purpose computer specially programmed to perform said steps of accumulating first and second metadata, extracting a plurality of patterns, creating, grouping, extracting at least one pattern, assigning, and generating.

22. A computer based system for monitoring innovation activity, comprising:
- a metadata element arranged to accumulate first metadata associated with a plurality of intellectual knowledge files and to accumulate second metadata associated with an intellectual knowledge file;
- a rules-based processor arranged to:
  - extract a plurality of patterns from said plurality of intellectual knowledge files;
  - create a plurality of concept spaces using said first metadata and said plurality of patterns;
  - group, using said first metadata and said plurality of patterns, said plurality of intellectual knowledge files into respective concept spaces in said plurality of concept spaces;
  - extract at least one pattern from said intellectual property file; and,
  - assign, using said second metadata and said at least one pattern, said intellectual knowledge file to a concept space among said plurality of concept spaces; and,
- a report generator arranged to correlate said plurality of intellectual knowledge files and said intellectual knowledge file with said plurality of concept spaces, wherein said metadata element, said rules-based processor, and said report generator are located in at least one specially programmed general-purpose computer.

* * * * *